(12) United States Patent
Travis

(10) Patent No.: US 7,779,994 B1
(45) Date of Patent: Aug. 24, 2010

(54) METHOD AND APPARATUS FOR MONITORING AND CONTROLLING CONVEYOR POSITION

(76) Inventor: Tonny D. Travis, P.O. Box 217, Prosperity, WV (US) 25909

(*) Notice: Subject to any disclaimer, the term of this patent is extended or adjusted under 35 U.S.C. 154(b) by 554 days.

(21) Appl. No.: 11/800,393

(22) Filed: May 5, 2007

Related U.S. Application Data

(60) Provisional application No. 60/838,052, filed on Aug. 16, 2006.

(51) Int. Cl.
*B65G 43/00* (2006.01)

(52) U.S. Cl. .................. 198/810.02; 198/810.01

(58) Field of Classification Search ......... 198/502.1, 198/810.01, 810.02, 810.03; 340/676
See application file for complete search history.

(56) References Cited

U.S. PATENT DOCUMENTS

| | | | | |
|---|---|---|---|---|
| 3,922,661 A | * | 11/1975 | Enabnit et al. | 198/810.02 |
| 4,541,063 A | * | 9/1985 | Doljack | 198/810.02 |
| 5,096,044 A | * | 3/1992 | Biebel | 198/502.4 |
| 5,957,263 A | * | 9/1999 | Espenschied | 198/349.95 |
| 6,047,814 A | * | 4/2000 | Alles et al. | 198/810.02 |
| 6,114,961 A | * | 9/2000 | Denholm et al. | 340/572.3 |
| 6,126,512 A | * | 10/2000 | Chao et al. | 451/9 |
| 6,131,727 A | * | 10/2000 | Nelson | 198/810.02 |
| 6,291,991 B1 | * | 9/2001 | Schnell | 324/235 |
| 6,585,108 B2 | * | 7/2003 | Travis | 198/810.02 |
| 7,132,943 B2 | * | 11/2006 | Nelson | 340/551 |
| 7,353,937 B2 | * | 4/2008 | Ziegler | 198/810.03 |
| 7,494,004 B2 | * | 2/2009 | Stolyar et al. | 198/810.02 |
| 7,586,410 B2 | * | 9/2009 | Tsirline et al. | 340/572.1 |

* cited by examiner

*Primary Examiner*—Douglas A Hess

(57) ABSTRACT

A Belt Positioning Unit "BPU" operation which in use for facilitating the maintenance of long, heavy conveyor belts of conveyor systems comprises the steps of (a) monitoring a conveyor belt for event sites, (b) spotting an event site and logging into a computer (1), sufficient data from which the computer determines and records the footage location of the event site on the belt, (2) belt drift footage data, and (3) take up belt footage data, and (c) using said data to control operational aspects of the conveyor system components, e.g., belt speed, drive motor power-off point (POP), or belt scraper pressure which affect the maintenance or condition of said event site.

10 Claims, 22 Drawing Sheets

Conveyor Layout with Remote Drive & Roof Mounted Discharge

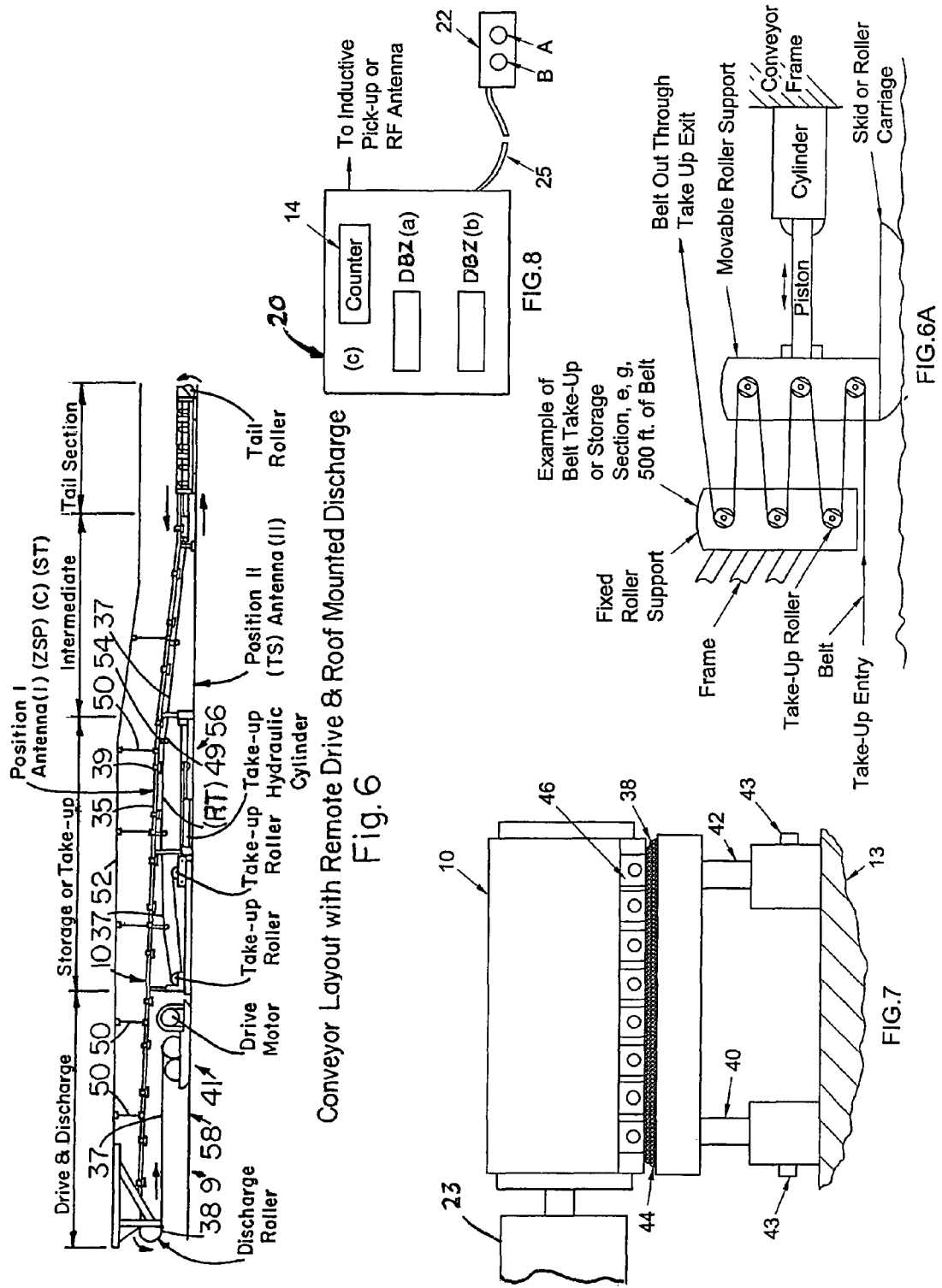

System Components and Installation

The following diagram illustrates the major components of the Belt Positioning Unit System and how they are connected:

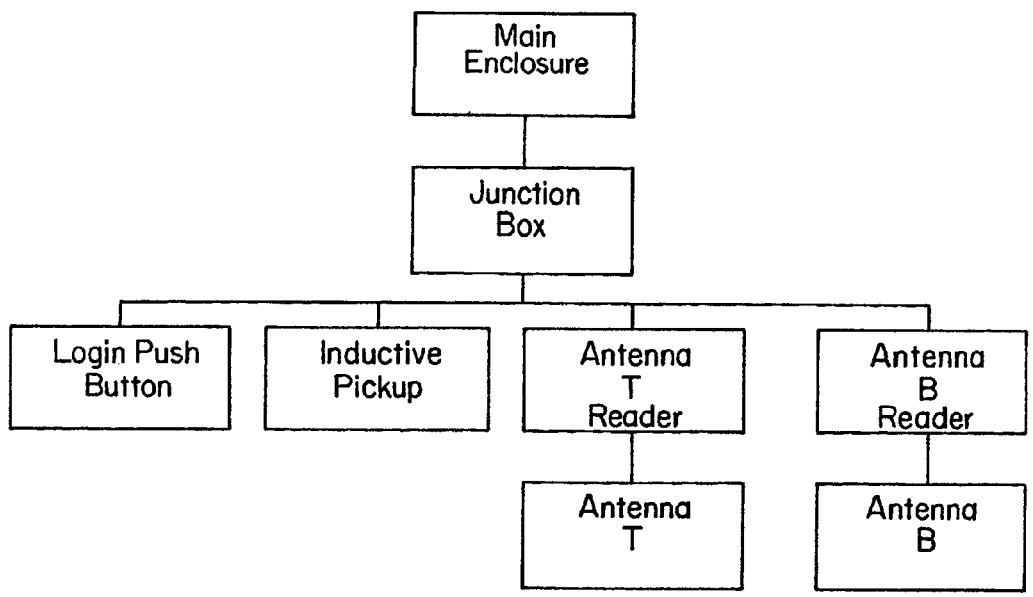

| Part Numbers ||
|---|---|
| Belt Positioning Unit (Standard System) ||
| Item Description | Part Number |
| Main Enclosure | BPU ME-1 |
| Two RFID Antennas | BPU ANT-1 |
| Two RFID Tags | BPU TAG-1 |
| Two RFID Readers | BPU RDR-1 |
| Inductive Pickup | BPU IP-1 |
| Inductive Pickup Mounting Bracket | BPU IPMB-1 |
| Remote Log-In Button | BPU RLB-1 |
| Junction Box | BPU JB-1 |
| Cable: Main Enclosure to JB | BPU CMEJB-200-1 |
| Cable: Inductive Pickup to JB | BPU CIPJB-200-1 |
| Cable: Log-In Button to JB | BPU CLIBJB-200-1 |
| Antenna Mounting Kit | BPU ANT MK-1 |
| Power Cable | BPU PC 1 |

Fig. 15

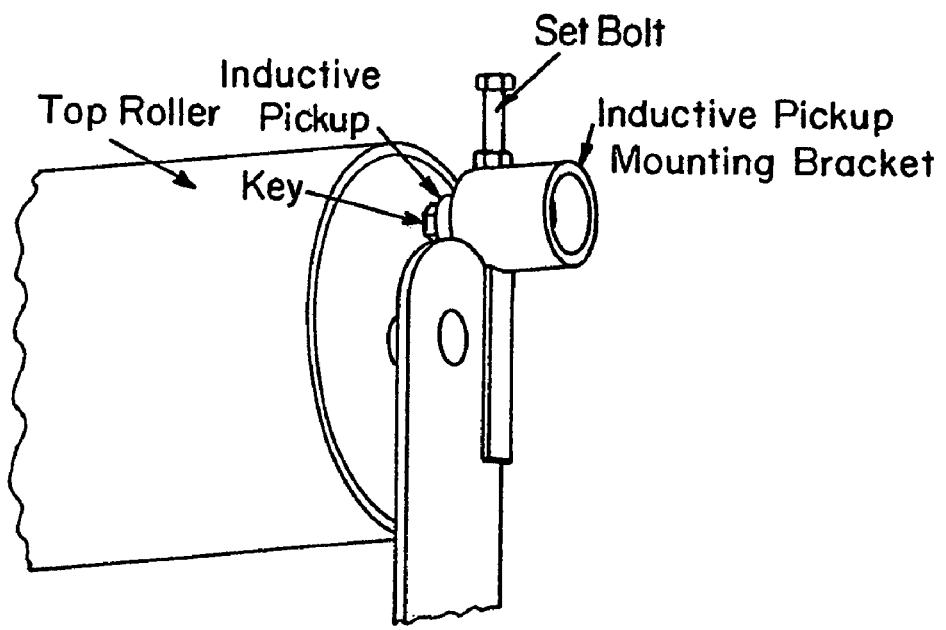
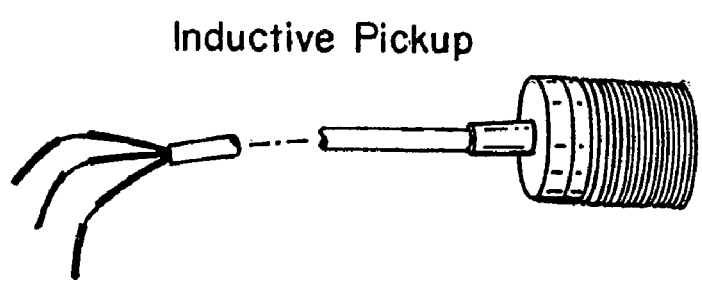
Fig. 21

Antenna B
Antenna B is mounted below the top of the conveyor belt as shown in the pictures below.
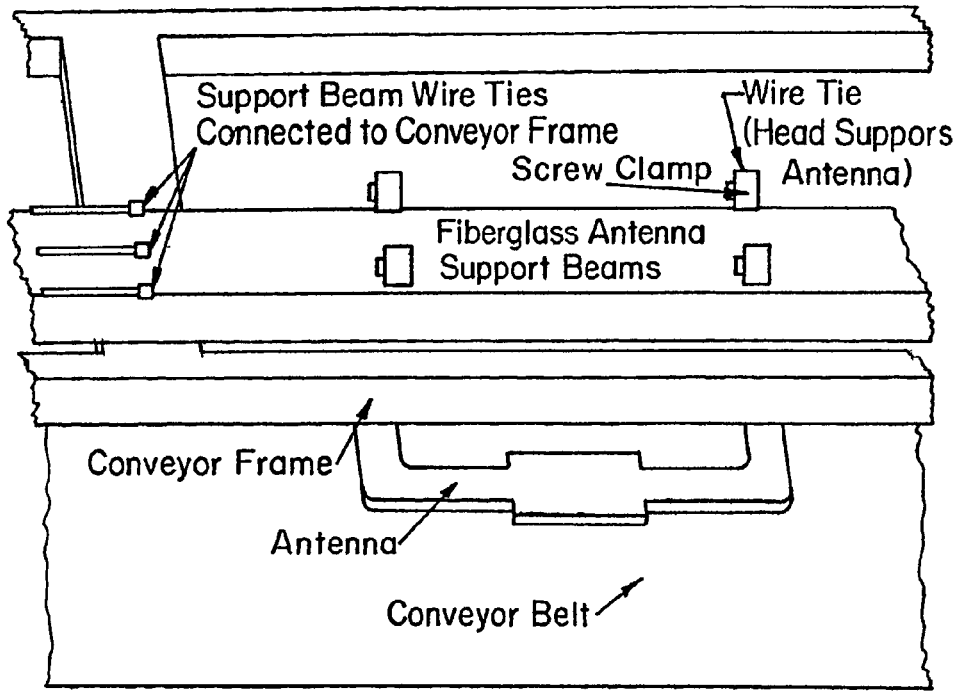
Antenna B Mounting Support (Front View)
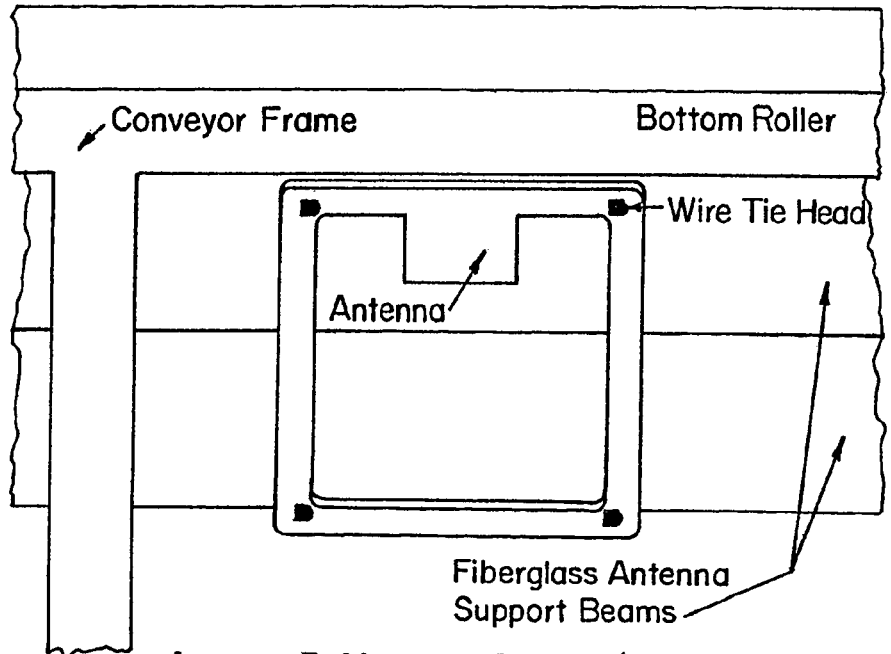
Antenna B Mounting Support (Bottom View)
Fig. 25

Installation Equipment
Belt Cookers
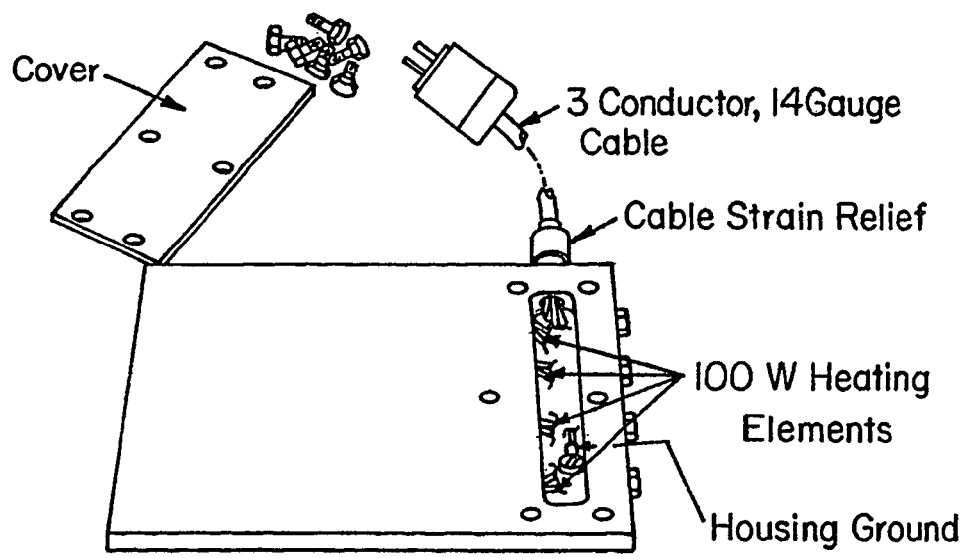
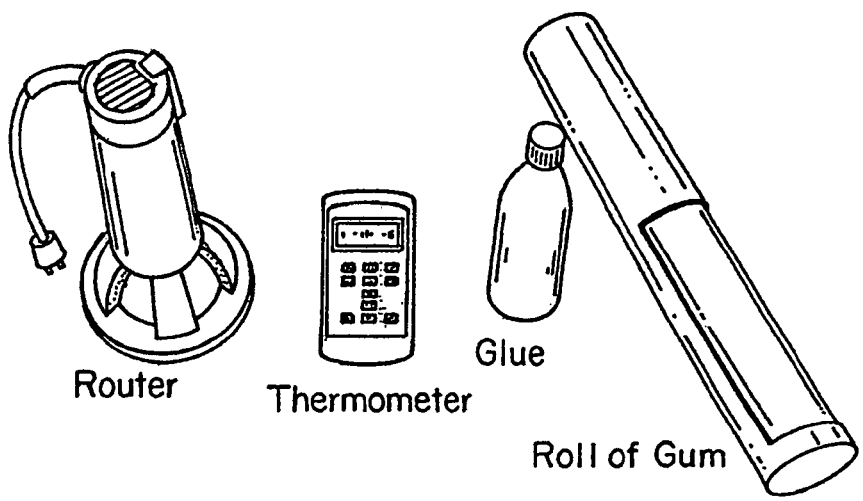
Fig. 26

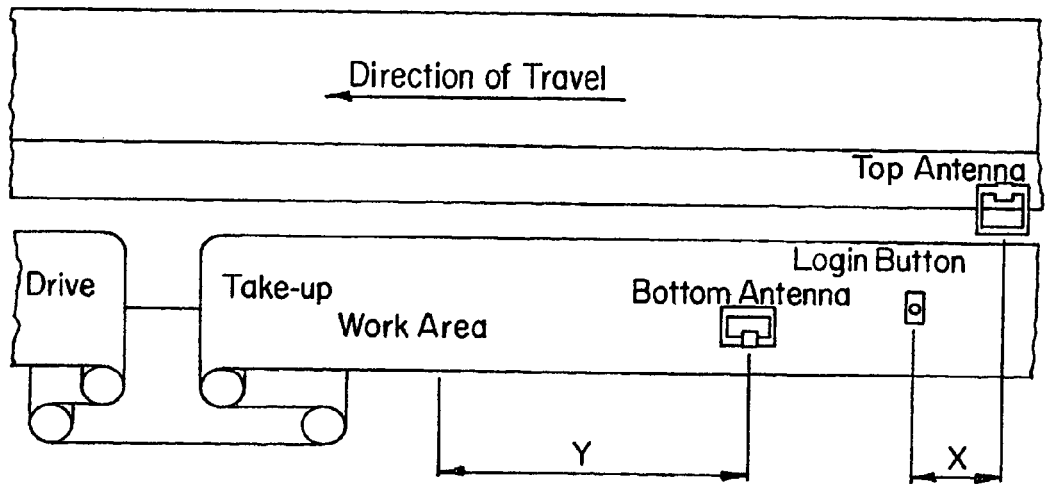
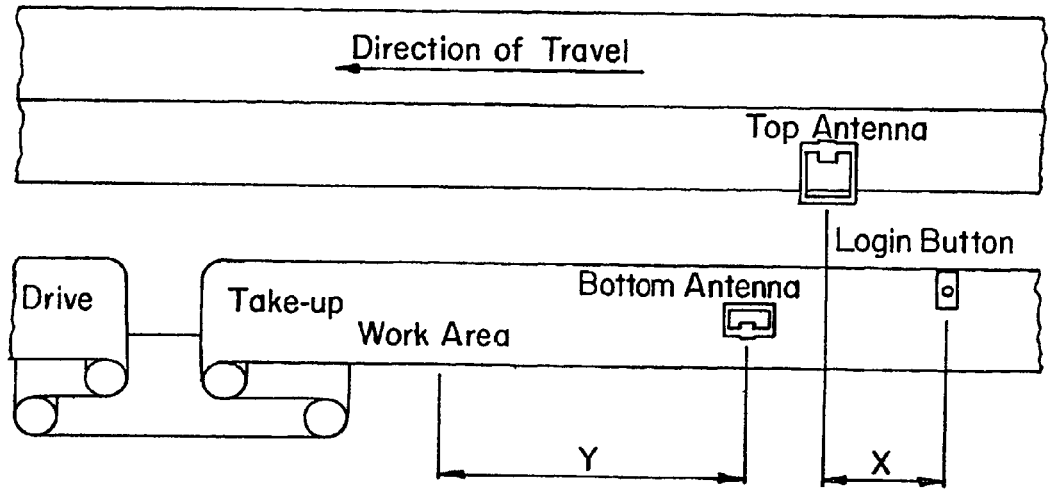
Fig. 28

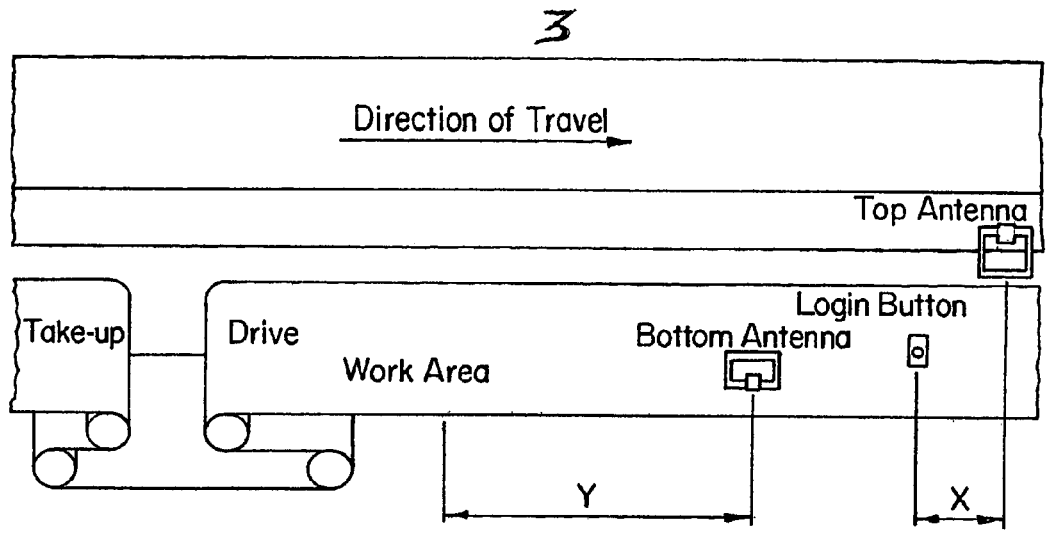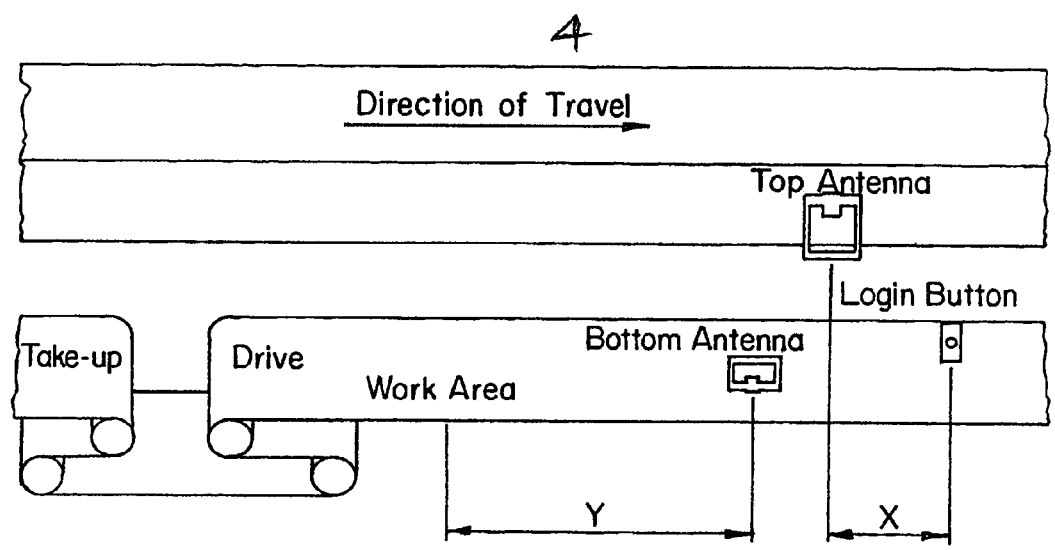
Fig. 29

EXAMPLES

ROLLER CIRCUMFERENCE CALCULATION

BELT DRIFT CALCULATION

METHOD AND APPARATUS FOR MONITORING AND CONTROLLING CONVEYOR POSITION

This is a complete application for Applicants Provisional 60/838,052 filed Aug. 16, 2006 of same title, and Applicant hereby claims the benefit and priority of said Provisional.

BACKGROUND OF THE INVENTION

1. Field

Conveyor system transport equipment such as belts, chains, cable, and rope, particularly conveyor belts of the lengthy and endless type used to transport material such as coal, minerals, products or the like over long distances typically comprise a drive roller means, a tail roller means, and a belt means, typically in 500-1000 ft., sections for long heavy duty belts, with their ends connected (spliced) to make the belt endless. Such belts are used to convey thousands of tons of material or product per hour. These belts range from one or two feet in width up to seven feet or more in width and are up to three or more miles in total length with several sections of belt spliced end to end with riveted metal splices or cured rubber splices, or other such means.

Coal mines and quarries, for example, typically use long, wide conveyors that carry thousands of tons of material at one lap of the belt. Obviously, proper maintenance of these belts is critical to maintain desired production rates and to limit conveyor, downtime, which can be several hours for severely damaged or separated belts. In the use of such long belts, damage areas such as rips, tears, holes, broken metal splices, partially torn apart splices and the like often occur and must be repaired quickly at a repair station, herein referred to as target station (TS), if a complete breakage and separation of the belt is to be avoided, and if an economical transport or production rate of the conveyor is to be maintained or restored.

Also, and as shown in FIG. 6, the present invention has application relating to conveyor belt scrapers. In underground coal mines, for example, belt scrapers are installed, typically at belt discharge points, to scrape material from the belt to prevent its being carried back on the return belt section. These scrapers are made in many different structural compositions, designs and configurations, however, because of federal laws and the labor required to clean up "carry back", belt scrapers with tungsten carbide blades are widely used. These scrapers are installed to scrape the belt with heavy pressure and because of this the scrapers do a lot of damage to the mechanical and vulcanized splices as well as the mechanical splices themselves damaging the scrapers. With the present invention it is possible to know when a splice is coming to a scraper (TS) and then to lessen the pressure on the scraper to prevent or minimize damage to a splice and to the scraper.

As further background, such long coal mine conveyor belts, being made of stretchable material such as polymer or steel belt or steel cable reinforced tire cord, must be placed under very heavy tension between the drive roller means and the tail roller means by, e.g., hydraulic tensioning apparatus in order to provide an adequately deformation resistant support surface and to prevent belt slippage on the drive roller means. As a consequence, for example, when a damaged splice is to be repaired and requires the belt section to be separated at the splice, the aforesaid tension must be removed which can shrink the length of the belt by several feet. Heavy clamping and other equipment must therefore be used to support and hold the adjacent ends of the belt sections into a precise position against the shrinkage forces such that the splice can either be repaired or replaced. A very convenient location for a repair station (TS) is in proximity to the accessible drive end of the conveyor, but most preferably just downstream of the belt take-up section.

The above described damage areas which may not have resulted in a complete separation of the belt, are primarily what the present invention is directed to. It is noted that for the worst scenarios such as a complete breakage and separation of the belt deep within the mine, the (TS) with all of its heavy attendant equipment necessary to pull the untensioned and shrunken belt back together to make a new splice, would have to be transported to the break site. It is noted that in describing herein the various applications of the present invention, the term "event site" (ES) is used to indicate undamaged splices, damaged splices, splices about to arrive at a scraper station, tears, rips, bulges, or the like in the belt, or any other site on or in the belt which may need instant or future attention from maintenance crews.

2. Prior Art

Heretofore, the detection of an event site, visually or otherwise, often has been only the first step in a very time consuming process for bringing the (ES) to a location where, e.g., repair of belt tear damage is feasible. For example, in long coal mines where the conveyor extends many thousands of feet, e.g., 3,000 or more, in low light and cramped conditions, the damage site may be detected on the fast moving conveyor, e.g., 10-15 mph or more, but controlling the motion of the enormously heavy belt such that the (ES) can be brought to a stop at a convenient repair station after a deceleration slowing down period is very difficult. The massive momentum of the belt, especially when loaded, prevents any rapid stopping of the belt and over running of the (ES) beyond the repair station (TS) often dictates that more than one complete and time consuming lap of the long belt will be needed to bring the (ES) again to a desired (TS) where the heavy and specialized equipment for handling the belt is available.

Another situation which occurs with long heavy belts is that of "belt drift" which is the distance the belt travels after the belt drive motor power is shut off. Over time, belt drift of a long belt will change due, for example, to changes in frictional resistance of the belt rollers due to lubrication effectiveness, bearing wear, or the like. Changes in belt drift will, of course, throw off the neatly planned timing of drive roller power-off point (POP) and will cause the (ES) to either stop short of or pass by the (TS).

A further situation which presents problems to accurately positioning a damaged splice or the like at a repair station is the fact that the amount of belt in the belt take-up or belt storage section is difficult to measure due to the necessary multiple shortenings of the conveyor length in, for example, long wall mining. Also, removal or addition of belt is often needed and accurate measurements of the adjusted belt lengths per se and that which is in the take-up or storage sections easily become unknown.

Principal objects therefore, of the present invention are to provide a method and apparatus for monitoring damage or other event sites on a conveyor belt and controlling the running of the conveyor such that a spotted event site on the moving belt can be quickly brought to a desired repair location, whether inside or outside a mine or quarry or the like, and/or to provide a monitoring system for the location of splices (event sites) in the moving belt relative to the position of belt scrapers whereby, for example, the belt scraper pressure can be quickly but temporarily relaxed as the splice is moving by the scraper to avoid damage to the splice and/or scraper, and/or to monitor and determine changes in belt drift and/or to measure belt footage in the take-up section, and then make the necessary changes in power shut off timing to allow the belt to properly bring the event site to a repair station.

SUMMARY OF THE INVENTION

The above and other objects have been attained in accordance with the present Belt Positioning Unit "BPU", which in one of its preferred method embodiments is designed for facilitating the maintenance of long, heavy conveyor belts of conveyor systems and comprises the steps of (a) monitoring a conveyor belt for event sites, (b) spotting an event site and logging into computer means (1) sufficient data from which the computer means determines and records the footage location of the event site on the belt, (2) belt drift footage data, and (3) take up belt footage data, and (c) using said data to control operational aspects of the conveyor system components, e.g., belt speed, drive motor power-off point (POP), belt scraper pressure, or the like which affect the maintenance or condition of said event site.

In another preferred embodiment the method comprises the steps of providing a conveyor structure having a continuous conveyor belt which is mounted on roller means mounted on base means of said structure, providing computer means for receiving, storing and calculating belt footage data, providing one or more counter means on said conveyor structure for measuring the distance traveled by one or more designated cycle points (CP) fixed in position on said belt, providing one or more reset means for resetting said counter means to zero each time a designated cycle point travels a measured cycle with respect to a designated fixed zero set point (ZSP) on said conveyor structure, logging belt drift data and belt take-up run data into said computer spotting an event site (ES) in the travelling belt and immediately transmitting a (DBZ) reading (i.e., the distance the event site has traveled beyond a designated zero set point at the moment of spotting) to said computer means which calculates the belt footage distance the event site has to travel to arrive at a designated (TS), and providing this data to an operator or an electronic motor controller such that the operator or motor controller can control the conveyor drive motor speed or power-off to stop said event site at said designated repair station.

In another embodiment, the above counter means provides a substantially continuous visual display of the remaining belt footage beyond the power-off point (POP) which the event site has to travel to reach the repair station, whereby an operator can readily determine when and how fast to decelerate or the power-off the drive motor to stop the event site at the repair station.

BRIEF DESCRIPTION OF THE DRAWINGS

The invention will be further understood from the following description and drawings wherein:

FIG. 6 is a side view schematic of a typical coal mine conveyor system to which the present invention can be adapted and employing the present (ZSP) belt drift footage and belt take-up run footage concepts;

FIG. 6A is a schematic of a take-up section showing the principles of its structure and operation;

FIG. 7 is discharge end view of a conveyor showing a hydraulically operated scraper blade in the retracted position away from a riveted splice;

FIG. 8 is a schematic of a hand-held control system useful for carrying out the present invention;

FIGS. 13-30 show self explanatory details of the present belt drift monitoring and calculating system.

DETAILED DESCRIPTION

Figure 1:
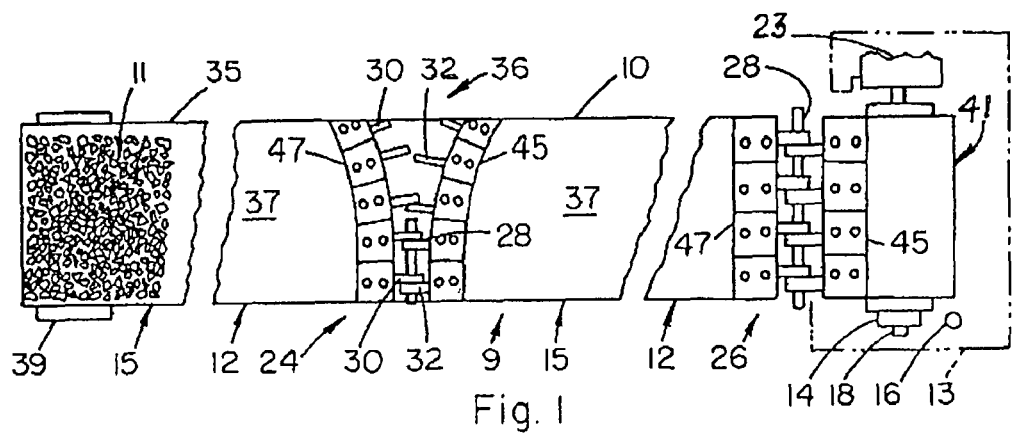
FIG. 1 is a top down schematic and simplified view of a conveyor with portions of the top run of the belt removed to show the lower run as it might be viewed by a damage spotter or inspector.

The following glossary will assist in understanding the present "BPU" system:
 (CP) cycle point
 ZSP zero set point (prescribed belt cycle travel footage reading at which counter is reset to zero (ZSP) or other prescribed reading)
 ES event site
 DBZ (C) reading at (SST) at time of (ES) spotting
 TS target station or repair station (RS)
 C counter means
 ESS event site signal
 MS mechanical splice
 VS vulcanized splice
 CR counter reading
 CPL cycle point footage of RF (RT) Tag from (C).
 LD lag distance
 RSBZ distance of RS beyond ZSP
 BD belt drift footage
 BTR belt take-up run footage (from Ant. I to Ant. II)
 POP power-off point
 STP stop point of belt
 RFID radio frequency identification tag
 SST spotter station
 CR counter
 RT reset tag
 ESS event site signal
 B button
 RSBZ known footage distance of (TS) beyond the (ZSP)
 POFI footage from (ES) spotting at (SST) to (POP) (Btr Antenna I and II)
 OD Offset Distance—footage from (TS) to (BTR) Antenna II.

In regard to the belt drift monitoring and calculating aspect of the present "BPU" system, the method and apparatus for monitoring and controlling conveyor belt travel and belt stop position (U.S. Pat. No. 6,585,108 B2) shows how an event site anywhere on a conveyor belt can be positioned at a repair station by employing the zero set point (ZSP) concept. The present belt drift monitoring and calculating aspect uses belt drift, i.e., travel of conveyor belt after the drive motor has been powered-off, in conjunction with the zero set point method to more accurately spot up, i.e., bring the event site to a prescribed position adjacent the conveyor for a needed repair or place for inspection in the belt. In this regard, over time the belt drift changes due to more or less friction on moving parts, more or less drag frictional and load, variations in lubrication of conveyor components, etc. This belt drift change can be recognized by the present method and apparatus, hereinafter Belt Positioning Unit or "BPU". This is accomplished by measuring the belt drift footage of a number of the most recent consecutive times the belt is stopped and logging then into the computer. An average drift footage thereof can be calculated and used by the "BPU" program to calculate, along with other data, the drive motor power-off point (POP) from which the (ES) can be accurately brought to a repair station (RS), belt drift each time. Each new belt drift is averaged with a chosen number, e.g., 4-8 previous belt drifts, thus continuously updating belt drift footage. The program will also move to (utilize) a new belt drift average if two sequential drifts are within 10 percent of each other and not within 10 percent of current belt drift average.

In regard to the belt taken up run aspect of the "BPU" system, and referring to FIG. 6, most conveyor belts are inspected on top, e.g., Position (I) located upstream of the belt discharge end, for damaged or worn splices herein called event sites (ES). When an (ES) is spotted and the spotter pushes the log-in button the counter (C) reading from (ZSP) to the (ES), e.g., its (DBZ) is logged into the "BPU" at this top location and the (ES) is to be stopped in most situations downstream of the take-up section at Position (II). If belt is added or taken out, the belt footage between Position I and Position II changes. The "BPU" has to know the changes in order to know when to power-off the drive motors. This is accomplished during initial conveyor installation when the belt footage from Position I to Position II is measured, i.e., after one lap of the belt whereby total belt footage also becomes known. With the discharge roller and tail roller fixed, any change in total belt footage must show up in the take-up section. As further described below, since the "BPU" always knows the belt footage from Position I to Position II, i.e., the (BTR) by way of antennas at these positions or at some measured distances therefrom, if the tail is moved, the "BPU" will be informed of the change in belt footage within the take-up section by the use of the two (BTR) RF antenna after one complete run of the (RT) between these antennas.

Referring further to the drawings and with particular reference to the claims hereof and to one preferred embodiment of the "BPU", the present invention is described in a method embodiment wherein a conveyor structure 9 having a long, continuous conveyor belt 10 with spliced together sections of substantial length and mounted on discharge end roller means 39 and drive roller means 41 is provided for transporting heavy materials 11 such as coal, ore, rock, minerals, product or the like at substantial speeds over long distances, wherein said belt is provided with one or more cycle point means (CP) 15 such as RFID tags, and with one or more zero set point means (ZSP) 16 such as RF antennas and receivers, wherein said (CP) and (ZSP) when juxtaposed provide a counter reset (RF) signal, said method comprising the steps of (a) providing one or more repair stations (RS) 12 positioned along said belt in proximity thereto, (b) providing one or more counter means (C) 14 for substantially continuously determining and recording the footage distance traveled by one or more designated (CP's) 15 on said belt beyond one or more (ZSP's) 16 fixed on a stationary portion such as base or frame member 13 of conveyor structure 9, (c) providing one or more reset means 18 for resetting one or more of said counter means to zero upon receiving a reset signal at the terminus of each measured cycle which can be one or more complete or predetermined partial laps of belt 10, and (d) as in the drawings, providing a control system 20 comprising transmitter means 22 for sending an event site signal (ESS) to a computer means 34 that an event site (ES) has been spotted at a particular (DBZ) (distance beyond zero set point of spotter and the (ES)) wherein said computer means is adapted to pick off, record and use the (DBZ) in a manner selected from the group consisting of (1) calculating the footage distance of the event site (ES) to the nearest or any desired forward repair station (RS) and signaling a controller for the drive motor 23 when to power-off the belt drive motor or how fast to decelerate the belt to stop the event site at a selected forward repair station (RS) 12, and/or (2) substantially continuously calculating and displaying on a viewing screen the location of the event site with respect to a repair station such that maintenance personnel can see numerically the approach of the event site toward said repair station and manually or electronically control the drive motor to stop the belt and event site at said repair station, and wherein belt-drift footage data and belt take-up footage data have been fed to said computer means for use in determining the most precise power-off point.

As mentioned above, and particularly in coalmines, some conveyors are long and may be, for example, 7500 ft. from loading point (tail) to discharge. If a conveyor is 7500 ft. long, it will have 15,000 ft. of belt. This belt will be put on the conveyor in about 1000-ft. lengths which means there will be 15 splices make the belt continuous. The splices can be of a mechanical type (MS) or vulcanized type (VS), but either type is a relatively weak link and subject to damage and wear and must be remade from time to time.

To locate old, worn or damaged splices or damaged areas, a visual inspection is typically required. An "inspector" or "spotter" will watch the belt to see if a new splice, for example, needs to be made. If such is required the spotter will tell the maintenance crew that the splice will be arriving at the repair station in, e.g., a few minutes, however, with present technology he cannot tell them where the splice location is in the belt with any practical degree of accuracy. Consequently, the splice often passes beyond the repair station before it is noticed in time to decelerate and stop the belt.

The present method establishes one or more reference points, i.e., stationary zero set points (ZSP) on, for example, the frame or base of the conveyor apparatus, and one or more travelling cycle points (CP) on the conveyor belt. These points in cooperation as described in detail below, allow event sites to be accurately located on the moving belt and to be found again very quickly. In operation, the conjunction of these (ZSP) and (CP) establishes the starting point for measuring the belt travel distance from the zero set point on the conveyor structure and can be established by means of a variety of sensing devices such as capacitive or radiation sensors, radio frequency devices, photo cell devices, or the like, but an inductive pick-up or a radio frequency device is presently preferred such as Escort Memory System's RFID model LRP 820. For example, when a piece of metal goes by an inductive pick-up, a signal will be sent to a PC (programmable computer). This signal will cause the PC to reset a counter means which is counting, e.g., in seconds or feet.

With a radio frequency device, an RFID tag is affixed into the conveyor belt by adhesive or vulcanization or the like as the cycle point, and a RF antenna is stationarily positioned on the conveyor structure so that as the tag goes by the antenna a circuit is charged in the tag allowing the tag to send a zero set point signal back to the antenna and then onto a reset means to reset the counter to zero or other desired initial value.

As an example and referring to FIG. 8, a counter 14 which can read in time and/or distance, e.g., seconds or feet is reset to zero set point of the counter, i.e., (ZSP) when the (PC) gets a signal from the inductive pick-up or the RF antenna. Then as an event site is spotted, the inspector will use the push buttons A and/or B on remote control or transmitter means 22 to log in and hold the reading (DBZ) of the counter (C) when he sees a damaged splice which requires attention. Control system 22 can be electrically connected by cord 25 of any length to counter 14, or 22 can be a cordless wave signal transmitter whereby 22 can be held in an inspector's hand. For example, when the inspector pushes button A, the counter reading (CR), i.e., (DBZ) will be logged in and held on (DBZ(a)). If the inspector sees another event site, he will push button (B) to log the counter reading of (DBZ(b)), and so on.

In regard to the (DBZ) reading, the inspector and his hand held control means 22 may be non-stationary and may move along the belt from and to any location convenient to the inspector. Then when the inspector sends a (DBZ) signal to the computer, the signal automatically or manually by the inspector includes the location of his hand held control means 22 along the conveyor. This variable position of 22 along the conveyor may be continually or periodically established by, for example, a radar or sonar or the like type communication between the stationary zero set point on the conveyor structure and the present location of the inspector and control means 22. Also, yard markers or the like along the length of the conveyor can be transmitted by the spotter along with the event site signal.

It is noted that since the counter of distance and/or time can be reset to zero at the terminus of a designated belt cycle distance, a reference point for calculating distances to be traveled by any event site to any location along the conveyor is established.

Figure 9:
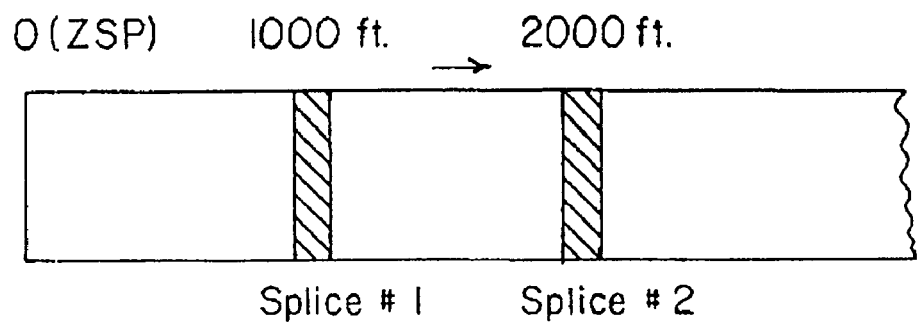
FIG. 9 is a schematic of a typical belt showing two visually displayed and/or computer mapped splices travelling toward a zero set point (ZSP)

Some other benefits of the present invention as shown in FIG. 9 include mapping the splices and other event sites of the belt and recording their (DBZ's) and other information on the event site, such as splice age, into computer means such that maintenance crews will have visual displays or other retrievable histories of splices or the like. The inspector and crews can use the map to know when the next splice or other event site of the belt is coming up toward a repair station in accordance with the present invention.

It is particularly noted that any number of counter means, reset means, cycle points on the belt and/or zero set points on stationary portions of the conveyor may be employed in order to provide any desired number and measures of cycles, as well as providing any number of repair stations. Such a multi-functional cycling system, if properly computer controlled, with of course, the assistance of inspectors or spotters, could reduce the travel time of event sites from their point of occurrence to a most proximate repair station. The computer system also is able to by-pass any of the additional zero set points or cycle points if their use for a particular conveyor installation or mining operation would not be appropriate.

Figure 10:
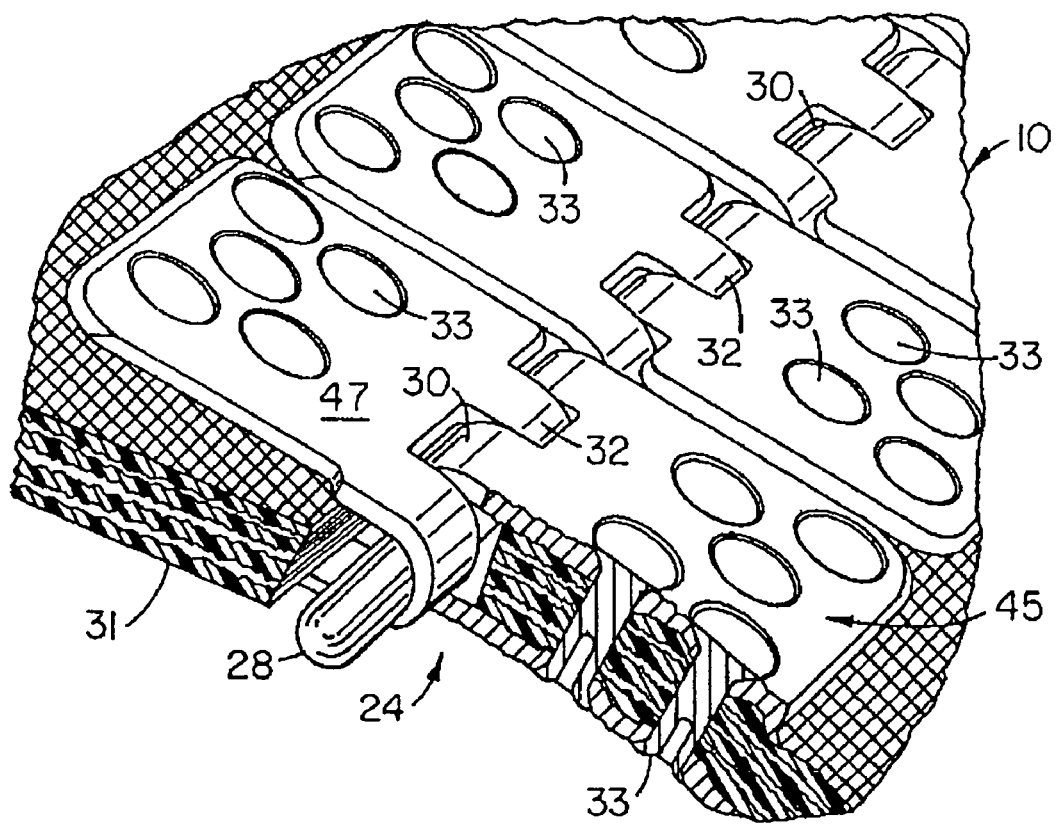
FIG. 10 is an isometric view of a portion of a heavy duty underground mining conveyor belt with a riveted hinge and marketed under the tradename FLEXCO®.

Referring particularly to FIGS. 1 and 10, belt 10 of, e.g., steel belted rubber 31 or the like, which may be up to three miles or more in total length and mounted on conveyor rollers within a mine is made up of several sections which are hinged together by splices such heavy metal splices 24 and 26 having halves 45,47 affixed to adjacent belt section ends by riveting 33 or the like and held together by hinge pin 28 mounted thru mating hinge bearings 30 on the splice halves. Other splices are widely used such as layered vulcanized rubber.

As often happens, a splice such as 24 will become damaged through, for example, breaking of the hinge pin 28 as shown in FIG. 1. Without early replacement of this pin, the entire conveyor system could be shut down if the pin further broke or if other damage resulted from the partial break, such as tearing away of the hinge halves from the belt sections. Other damage often experienced is tearing of holes or splits in the belt, partial ripping of vulcanized splices, or the like, all of which are event sites.

In carrying out a preferred embodiment of the present method, with reference to FIG. 1, one or more repair stations 12 are located along the conveyor within and/or outside the mine. These stations can be fixed in location or can be moved, and increased or decreased in number depending on the conveyor maintenance needs dictated by mining conditions and mining operation strategy, or the like. It is noted that the event site can be spotted and the repair made either on the top run 35 or bottom run 37 of the belt. Where the repair is to be made to the top run the event site area would typically be cleared of material being transported.

An operator or spotter is provided preferably with a transmitter means such as 22 for sending a signal or data to a computer means 34 indicating that at that time, and at that reading of counter (C), and at that location along the conveyor an event site 36 in the belt has been spotted. The computer means, which will already have recorded the (BD) and (BTR) data, can display or otherwise use the data to calculate the (POP). A display of the counter readings from the event site (DBZ) to a repair station or to a scraper, or a display on the computer screen or other visual display means of the diminishing distance of the event site to a repair station in, e.g., feet or yards or time can then be used by maintenance personnel to keep track of the event site as the belt moves thru a measured cycle, e.g., a full or partial lap of the belt. Then, as the event site approaches a repair station, an operator can control either manually or electronically the drive motor to stop the belt and event site at the repair station.

In another preferred embodiment wherein the spotter stations and repair stations are at the same locations, the computer means 34 which will have recorded the (DBZ) data and also the present locations of all repair stations, can immediately calculate the distance in either linear measurement or time from the event site to the next or any other desired forward repair station 12. The computer can then also immediately calculate the belt drive motor (POP) needed and signal the drive motor controller to stop the event site at a desired repair station.

Figure 2:
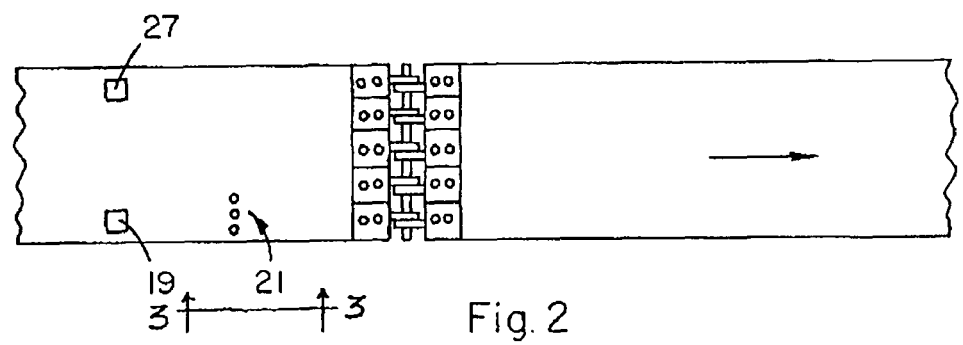
FIG. 2 is a top view similar to FIG. 1 and showing an operable position for a zero set point (ZSP) device including its stationary zero set point component (sensor) 19 and its moving cycle point component (metal rivets or equivalent) 21 installed in edge of the conveyor belt.
Figures 3, 4:
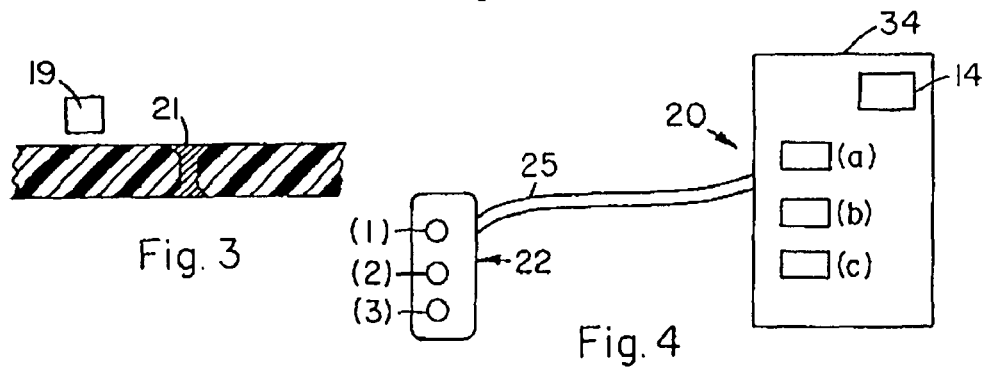
FIG. 3 is a side view, partially broken away, taken along line 3-3 of FIG. 2 in the direction of the arrows.
FIG. 4 is a general layout of an operable electronic control system for carrying out the above-described methods.
Figure 5:
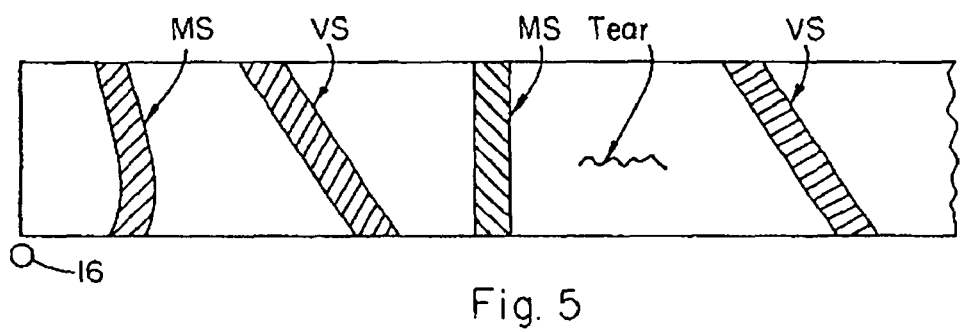
FIG. 5 is a plan view of a conveyor belt showing various aspects of the belt which can be monitored by the present invention.

Referring to FIGS. 2 and 3 which show one way that the zero set point can be established for both mechanical and vulcanized splices, the sensors 19 and 27 are stationary on the conveyor frame or other stationary structure thereof, and the rivets 21 which represents a cycle point 15 move with the belt. Both sensors 19 and 27 will read when metallic mechanical splices (MS) come by since they span both sensors. However, only the one sensor 19 positioned over the rivets 21 will read when the rivets go by. If both 19 and 27 read, the counter will not reset to zero. When sensor 19 reads and sensor 27 does not, the counter will reset to zero. The sensor can be any of a large variety of industrial devices such as those sensitive to electromagnetic, infrared, or ultraviolet radiation, or to changes in voltage, current or electrical resistance such as to generate a transmittable signal.

Figure 11:
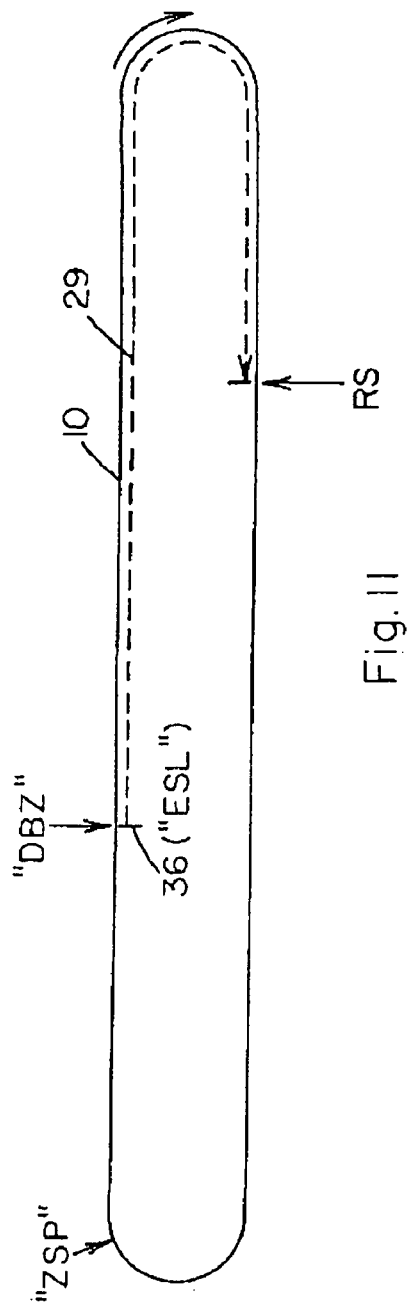
FIG. 11 is a schematic of one embodiment of the use of a (DBZ) in bringing an event site (ES) to a selected repair station (RS), also termed herein as a target station (TS)

Referring to FIG. 4, push buttons 1, 2 and 3 (any number of buttons can be provided for any number of event sites) of transmitter means 22 selectively lock in the event site (DBZ) readings of the continuously reading counter (C), i.e., into the three displays (a), (b) and (c) respectively. Counter (c) runs all the time and is set to zero, i.e., the zero set point (ZSP) when rivets 21 pass sensor 19. These displays will hold the (DBZ) readings of counter (C) when their associated buttons are pushed, however, these displays can be controlled to show a diminishing progression from the (DBZ) measure to a zero value or equivalent at the next selected repair station. As shown, for example, in FIG. 11, the distance of a spotted or mapped event site to a (RS) is substantially the length of dotted line 29. This measure is obtained by subtracting the distance of the (ZSP) to the (DBZ) from the total belt footage of the (ZSP) to the (RS) taking into account (BD) and (BTR). It is preferred that the length of 29 be displayed to the maintenance personnel as a progressively diminishing number, e.g., 1100 ft., down to zero ft., as the event site moves toward the (RS).

Figure 12:
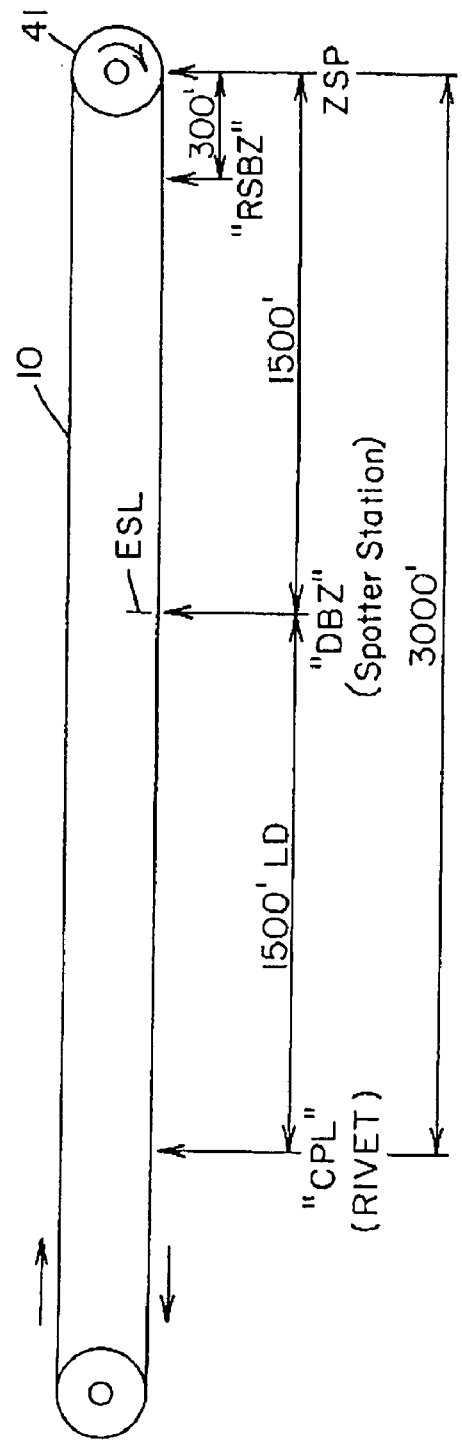
FIG. 12 is a schematic of a conveyor showing a preferred method for calculating footage distances of travel of the event sites to repair stations.

Referring to FIG. 12 and in further explanation of one method of calculation, when the event site (ES) spotting (DBZ) signal is sent to the computer, the computer already has or simultaneously receives the cycle point location (CPL) on the belt from (C). The lag distance (LD) of the (DBZ) from the (CPL) is calculated and logged into the computer. Then when (C) is reset to zero, the (LD) is added to the known (BD) and (BTR) and footage distance (RSBZ) of the (RS) beyond the (ZSP) to numerically show maintenance personnel what (C) reading (CR) will place the (ES) at the (RS).

EXAMPLE $$\left.\begin{array}{l} CPL = 3{,}000' \\ DBZ = 1{,}500' \\ LD = 1{,}500' \\ RSBZ = 300' \end{array}\right\} \begin{array}{l} CR = RSBZ + LD \\ CR = 300' + 1{,}500' = 1{,}800' \end{array}$$

Referring to FIGS. 6 and 7, a typical scraper blade 38 is mounted on pistons 40 and 42 of hydraulic cylinders, e.g., double acting, such that an electronic signal received by electronically controlled hydraulic fluid values 43 can actuate the pistons to either force the blade against the belt 10 to remove "carry back" material 44 therefrom. In accordance with the present invention, the splice 46 which is a spotted event site, will be avoided by blade 38 which will be retracted as shown, just long enough to allow the splice to move beyond it. Again, the retraction and reengagement of blade 38 by operation of the hydraulic valves 42 can be done automatically from mapped data logged into computer means or by manual operation of the valves by an operator.

A typical scraper blade 38 is mounted in pistons 40 and 42 of hydraulic cylinders, e.g., double acting, such that an electronic signal received by electronically controlled hydraulic fluid valves 43 can actuate the pistons to either force the blade against the belt 10 to remove "carry back" material 44 therefrom. In accordance with the present invention, the splice 46 which is a spotted event site, will be avoided by blade 38 which will be retracted as shown, just long enough to allow the splice to move beyond it. Again, the retraction and reengagement of blade 38 by operation of the hydraulic valves 42 can be done automatically from mapped data logged into computer means or by manual operation of the valves by an operator.

"BPU" Computer Operation

Further to the above use of the (ZSP) and as an example of operating the "BPU", when a belt is unloaded and an (ES) has been spotted and its (DBZ) logged-in and the (ES) is being brought by the moving belt to a (TS) for inspection or repair or other considerations, the already known operating factors include those as follows which have been logged into the computer prior to spotting of the (ES):

a) belt speed (ft./min.);
b) total belt length footage;
c) belt drift (BD) average footage;
d) belt take-up run (BTR) footage;
e) reset tag (RT) footage from (ZSP); and
f) the belt footages between each of counter (C), (ZSP), (BTR) Ant. (I), (BTR)Ant. (II), (TS), and (SST).

The computer then calculates the belt footage which the (ES) has to travel beyond its logged-in (DBZ) in order to activate the yellow warning light that a belt stoppage is drawing near, and then subsequently activating the red stop light (with powering-off the belt drive motor) and preferably with displaying the belt count-down footage, (DBZ) to zero which will run in order for the belt and (ES) to stop at the (TS). As further elucidated below, the computer display panel(s) can be set up at any (TS) including any other desired work inspection or viewing location(s) along the conveyor or even outside the mine.

As a further example of how to employ the present "BPU" in a typical situation, assume that the conveyor is fully installed, is unloaded, and with the computer data of the above "BPU" computer operation description established, wherein the belt speed is within, e.g., about 3.0% of the normal empty belt speed (typically 600-800 ft./min.) and wherein the latest belt drifts (BD) comprise a series of six consecutive drift measurements of 50', 48', 51', 46', 49' and 47'. The average of these measurements equals 48.5'. As long as subsequent drifts are within the (BD) range of 53.35'-43.65', i.e., approximately 10 feet, the repair station can accommodate the 10 foot variation in the belt stopping place without having to alter or modify the repair equipment or its operation in order to make a repair or detailed inspection. Thus for the above (BD) scenario, the belt drive motor "power-on footage interval" (POFI) between arrival of the event site at a spotter stations and turning on the yellow warning light and then the red light which signals powering-off the belt drive motor (POP) will remain as is. Also, it is preferred that this (POFI) be preserved even though one or more subsequent drift measurements fall outside of the above (BD) range so long as these aberrant measurements are not consecutive. If two such aberrant measurements are consecutive and if they are within 10% of each other, then the "BPU" will automatically reset the aforesaid (POFI) footage interval to reflect averaging into the series of the two aberrant drift measurements.

It is particularly noted that the above example is not restrictive of how to employ, mathematically, the concepts of zero set point and belt drift averaging in accordance with the present invention. For example, in averaging, e.g., six prior belt drifts wherein the most recent is No. (6), more weight can be given to No. (6) than to the others, e.g., twice as much. Also, the averaging can be done on a scale whereby, e.g., drift No. (6) can account for 40% of the total six drift footages, drift No. (5) (second most recent) 30%, drift No. (4) 15%, drift No. (3) 7%, drift No. (2) 5%, and drift No. (1) 3%. Any such calculation scheme, no matter how mathematically complex, can be employed in order to utilize actual (BD) experience to further the accuracy of the power-off point (POP) calculation.

Further, in the operation of coal mines and the like wherein the conveyors and/or the belts are shortened or lengthened (adjusted) for various reasons such as for necessary movements of the conveyor tail section, or for removal of damaged belt, or for overloading of the belt take-up or storage section, or the like, the actual accurate belt footage between the aforesaid (BTR) antennas I and II often can become unknown. For example while total belt footage of adjusted belt footage (length) can be determined by means of the counter and (ZSP), the actual belt footage between said antennas remains uncertain since the belt footage (e.g., up to 500 ft.) within the take-up or storage section becomes unknown. In this regard, in a typical longwall mining operation the tail section must be moved toward the take-up section about 5 ft. or so for each pass (e.g., 1000 ft) of the shearer. Each pass would take from about 45 min. to an hour or so and the take-up section would need to accommodate these take-ups which can be, e.g., 100 ft. or more per 24 hours. Typically, an empty belt inspection is done at the beginning of each 8 hour shift and takes about ½ hour. The (RS) can be, e.g., 20 ft-100 ft. long and sufficiently wide for power equipment such as hydraulic powered lift vehicles and the like to maneuver.

An aspect and preferred embodiment therefore of the present "BPU" is the provision of the aforesaid dual antennas I and II, wherein as an example of their use referring to FIG. 6, the first one is at Position I and the second one is at Position II. In operation, antenna (I) picks up the (RT) signal from the moving belt and enters a zero footage reading into the computer. As the (RT) moves to antenna II, the total belt take-up run footage (BTR) from Position I to Position II as recorded by the counter is picked up by antenna II and entered into the computer. With this information the aforesaid footage interval (POFI) can be adjusted automatically by the computer to power-off the belt drive motor at exactly the desired point (POP).

Referring particularly to FIG. 6, the present "BPU" in its most preferred embodiment may be defined as comprising three basic components of a zero set point (ZSP), a belt drift footage (BD), and a belt take-up run (BTR) footage.

The (BD) is the average of several variable belt footages which run between the belt drive motor power-off point (POP) and the actual stop point (STP) of the belt, which (STP) for the present system is located at the (RS).

The (BTR) measure is the belt footage which runs between two chosen points on stationary structures adjacent the belt, where the belt footage between said points includes the variable belt footage contained within the take-up.

As an example, in operation of the present system with the belt length of 10,000', a belt speed of 600'/min, from about 10-20 belt splices, and the various belt measuring and footage RF signaling components of the system arrayed as shown, the (RFT) is shown as currently (just) setting the belt footage counter to zero such that the subsequent footage of the (RFT) beyond the (ZSP) is given directly by the counter and continuously logged into a computer.

A spotter at station (ST) spots an (ES) at, e.g., (ZSP) on the counter (CR) and logs this zero footage into said computer. A belt drift (BD) of 150', e.g., the average of the last six belt stoppages, has already been logged into the computer. A belt take-up run (BTR) of 1500', i.e., the belt footage from RF Antenna (I) to RF Antenna (II), including all of the belt in the take-up, has been determined subsequent to the last belt stoppage and logged into the computer.

The belt drive motor power-off point (POP) must now be determined in order to allow the (ES) to drift to the (TS). This (POP) is at a certain footage beyond the (ZSP) and is read directly from the counter (C) and is equal to the total footage in the belt take-up run (BTR) between RF Antenna (I) and RF Antenna (II), less the belt drift (BD) of 150', i.e., POP=1500'-150'=1,350'.

In the above example the sensing/signaling device employed for the (ZSP) resetting of the counter comprises the stationary Antenna (II) of an (RF) detection/signaling device and a reset tag, e.g., (RFID) laundry tag, (RT) fixed to the belt. The (RF) Antennas (I) and (II) are stationary and cooperatively with the (RT) generate and transmit belt footage signals to the computer as the (RT) moves past the (ZSP) thru the (BTR) run and into the (RF) signal field of Antenna (II) to give total belt footage in the (BTR) take-up run.

Also in the above example, the spotter station (SST), counter (C), (ZSP), Antenna (I) and (RT) are shown as being all set up at the same location along the conveyor, as are Antenna (II) and the (RS). These particular alignments are, of course, unnecessary and in actual practice would not usually be employed. For example, in a coal mine situation, the spotter stations (SST) as well as Antenna (I) and counter (C) could be several hundred feet or more from the (ZSP), as could the (RS) from Antenna (II). In this regard, the (ZSP) provides a means for determining a huge number of operational measurements, for example, for the belt footage of (RT) from (ZSP) always known to the computer by direct footage counting by (C), for the belt footage from the spotter station (SST) to the (ZSP) preset, e.g., at conveyor installation time or by direct footage counting of (C), and for the belt footage from Antenna (II) to (RS) preset or determinable by the counter after a belt lap, whereby the (POP) timing can be calculated by the computer thru simple addition or subtraction of preset or (C) determined belt footage.

In this regard, in coordination with the above system and its components, additional RF tags and antennas, or other mechanical or wave responsive devices can be employed in order to facilitate inspection and repair of long, underground mine conveyor belts. For example, a spotter positioned in a well lighted spotting station and with a hand-held transmitter can log-in, during one or more laps of a non-loaded belt, the belt footages with reference to the (ZSP) of all splices, new and old, mechanical or vulcanized, and of new or old repairs of rips or tears or the like in the belt. This could be of great value in situations where splices or repairs (ES) are difficult to spot visually, such as when trying to view and assess the potential life span of a vulcanized splice repair in a belt traveling at ~12 ft. per second in a poorly lighted place in a coal mine. With such a mapping logged into the computer, a warning light or buzzer or the like could be activated by the computer at a desired distance of the (ES) from a well lighted location such as at a designated repair site where the (ES) can be readily viewed by a repair crew.

Such additional tags can be, e.g., adhesively secured in vulcanized splices or other (ES) and when passed by the (ZSP) antenna can be individually identified and logged into the computer such that by use of the "BPU" each of their calculated arrival footages from the (ZSP) to a (RS) can be displayed and alerted to the work crew at the (RS), whereby the crew can further manipulate the speed, positioning or the like of the belt by signaling the computer.

A preferred technique for affixing the RFID tags into the belt employs a router to cut out a recess in the conveyor belt. This recess is routed out from the bottom side of the belt, and is made larger than the tag, so that adhesive and rubber will completely encase the tag. Heating platens are placed above and below the belt and "C" clamps are used to add pressure. The platens are kept at 300° F. for about 40 minutes, this cures and/or vulcanizes the adhesive and rubber. Another technique to fix the tag in the belt is to route out a recess as above and use a time or heat curable urethane to hold the tag in the belt.

Within the ambit of the present "BPU" system is the use of (RFID) tags for each or selective (ES) wherein the tags have the capacity for receiving and storing data such as the exact time and date a vulcanized splice was made, how many laps have been experienced by the splice for quality control or R & D, or what composition or technique was used for the splice, and then transmitting such data to a computer when requested by RF interrogation. Such RF devices are well known to the art and are described, for example, in U.S. Pat. Nos. 5,030,807 and 4,390,880, the disclosures of which are hereby incorporated herein by reference in their entireties.

A further utilization of the above basic system, preferably with the above additional RF tags (RFID) in each splice, is in combination with one or more imaging instruments which can take a picture or video at a prescribed photo location, preferably digital, of each (ES) and transmit it to a remote location such as outside the mine for viewing and assessment or the like. The pictures can be taken each time an (ES) RF tag passes by a coactive RF antenna, receiver and transmitter positioned at said photo location.

Further preferred operational aspects of the "BPU" which can be displayed on the computer panel or on any other display panel within or outside the mine include:

a. Feet from Zero: Displays belt footage from zero set point in feet.
 b. Log-In Places: Allows multiple event site locations to be logged in.
 c. Stop or Power-Off Light: The stop light is programmed for belt drift, which is the distance the belt moves after power is disconnected.
 d. Warning Light: The yellow light warns that the red power-off light is about to come on. When the red light first comes on power should be disconnected, letting the logged-in place drift into position at (RS).
 e. Belt Speed (Feed per Minute)
 f. Unloaded Belt Drift (Feet)
 g. Roller Circumference: This is the circumference (in inches) of the roller that the inductive pickup is reading.
 h. Manual Log In: Allows a belt footage to be entered and loaded into one of the log-ins for location.
 i. Total Belt Feet.
 j. Restack Capability Of Computer: Allows the (ES) log-ins to be prioritized.

BENEFITS OF "BPU"

a. Logged in places can be quickly positioned for inspection and/or repair;
 b. Motors will be subjected to fewer unnecessary starts;
 c. Assures that the correct places are positioned for repair;
 d. Allows the belt personnel to keep check on bad places;
 e. Allows belt personnel to determine footage between splices;
 f. Allows mapping of the belt with splices at the correct footage from zero set point;
 g. Allows the worst places in the belt to have priority;
 h. Simple to use;

Additional preferred operational aspects include:
 1. A light preferably yellow or amber that comes on at (RS) before the red shut down (power-off) light comes on. This light will warn that the red light is about to come on;
 2. Since the RFID tag used to establish the zero set point may fail, two or more tags can be used for the zero set point, and an alert light can come on when only one tag is still functioning;
 3. A manual entry—this will allow finding a known place in the belt conveyor; and
 4. Belt speed, belt drift, and belt load are all related for a level or straight incline conveyor (straight incline is when a head is above tail in elevation and straight line from head to tail). Therefore, by knowing empty belt drift and speed and also knowing loaded belt drift and speed, belt drift can be determined for a given conveyor at any belt load.

Figure 13:
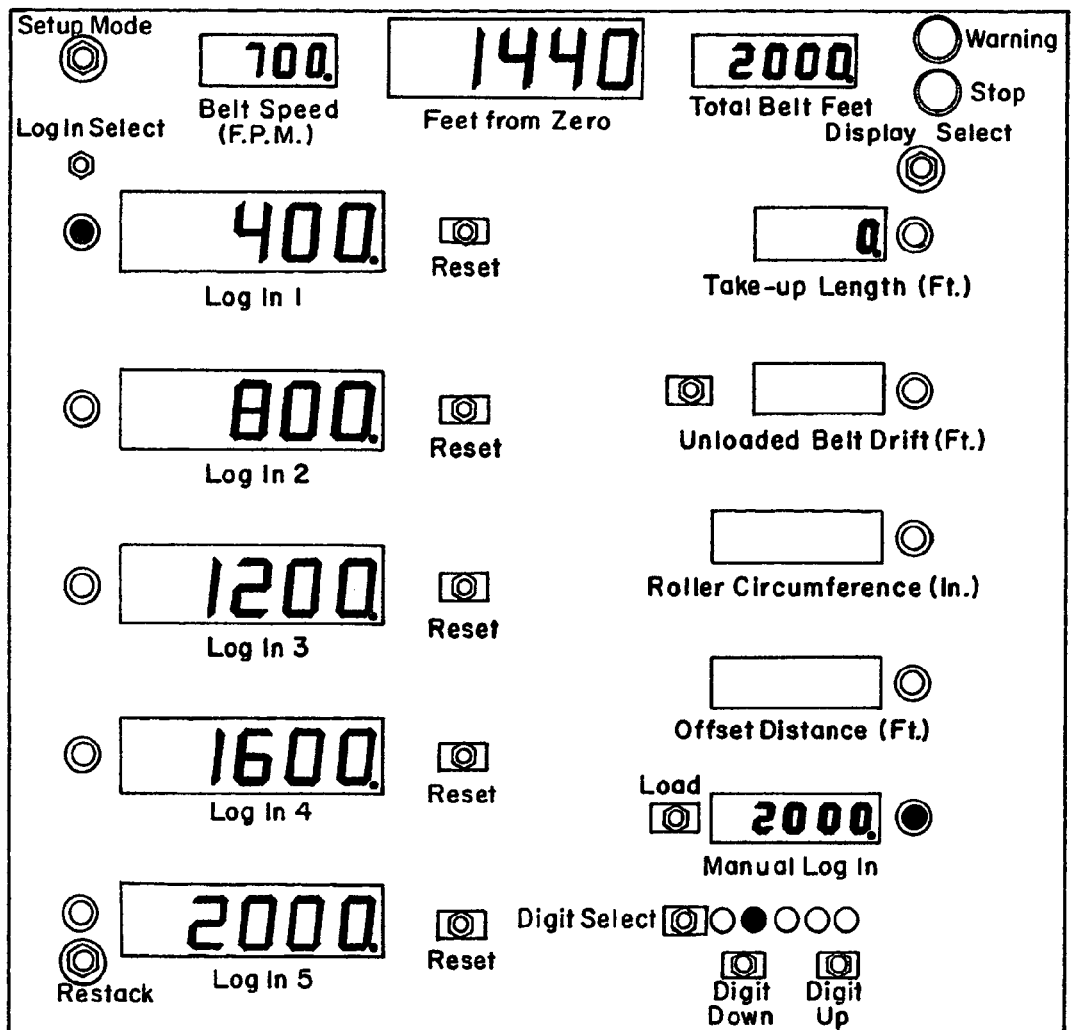

A Preferred Display Panel and an Example of it's Set-Up (FIG. 13)

"Feet From Zero": Displays the belt footage distance of the reset tag (RT) from the zero set point antenna.

"Log-in (1, 2, 3, 4, 5)": There are five (ES) log-in sites (displays) arranged vertically, each having a push button positioned to the left of a log-in display window, which buttons, e.g., if all are pressed would represent five (ES) located at five different (DBZ) footages. An (ES) log-in can be made either by pressing the log-in push button or by pressing the load button next to the manual log-in display.

"Stop": When a logged-in (ES) is the belt footage of 1.5, belt drift footage away from the target station (TS), e.g., a repair station and/or an inspection station, the yellow flashing warning light will begin and preferably a lighted display of the footage of the approaching logged-in (ES) from the (TS) will begin to count down to zero (TS), with the yellow light flashing coming more frequently as the (ES) moves closer to one belt drift footage away from the (TS). The red stop light will come on when the (ES) is one belt drift footage away from the (TS). If maintenance is to be performed on the belt, motor power should be cut promptly when the red light first comes on to stop the belt at the (TS). The (ES) log-in lighted display on the "BPU" display panel will begin to flash within twenty feet of the (TS), indicating the particular (ES) to be inspected. Note: The target station (TS) where work is to be performed is preferably at a fixed position relative to the conveyor and usually is located downstream of the take-up section.

"Reset": Pressing the reset button next to a respective (ES) log-in display window will clear that (ES) log-in.

"Log-in Select": Selects the (ES) log-ins for restack, i.e., the highest priority being displayed at the top most site and the lowest priority displayed at the bottom site.

"Restack" The restack button changes the priorities of the (ES) log-ins. The currently selected log-in is indicated by a lit green light to the left of its log-in display window. This feature directs inspection to the more critical splices first, as determined, e.g., by the spotter.

"Take-up Length": The take-up length is how many feet of useable belt is currently in the take-up section.

"Unloaded Belt Drift": The unloaded belt drift is a measure of the footage that the belt will drift after motor power to the empty belt is cut. This footage will be updated automatically or it may be changed manually in setup mode.

"Manual Log-in": A belt inspector can use the "Manual Log-in" to log in an (ES) without the need for the belt to actually run to the (SST). This is the only display which can be changed outside of setup mode.

"Load": Pressing the load button loads the (DBZ) footage shown in the manual "Log-in" display into one of the five log-in sites. If entering a security code, pressing this button will change the "BPU" to setup mode if the correct code is given.

"Offset Distance": This is the distance of belt (in feet) between the (ES) log-in push button and the location where work is to be performed at a (TS).

"Digit Select": Pressing the digit select button specifies which digit of the currently selected display is to be changed, for example changing the "O" in "Take-up Length" to 5. Which digit is currently selected for changing is indicated by a common lit green light below each vertical digit column.

"Digit Up": Increments the currently selected digit of the currently selected display.

"Digit Down": Decrements the currently selected digit of the currently selected display.

"Display Select": The display select button specifies which display of "Take-up Length", "Unloaded Belt Drift", "Roller Circumference", or "Offset Distance" can be changed. The currently selected display is indicated by a lit green light to the right of the display window. The display select button only works while operating in the setup mode.

"Setup Mode": After holding the setup mode button for three seconds in normal operating mode, a prompt is given for the security code to be entered in the manual log-in entry display. After the correct code is entered and the load button is pressed, the unit enters setup mode, which enables changing of primary settings of the unit. If the correct code is not entered within a twenty-five minute period or the unit has been in setup mode for twenty-five minutes, the unit returns to normal operating mode. Normal operating mode can also be entered by holding the setup mode button for three seconds while in setup mode.

"Roller Circumference": Roller circumference of the counter (C) is used to configure the footage between each hit of the inductive pickup.

"Total Belt Feet": The total belt footage display shows total length of the belt in feet. Note: This value will be correct after the (ZSP) reset tag (RT) has passed under the (ZSP) antenna at least twice.

"Belt Speed": Displays the belt speed in feet per minute.

The belt take-up run (BTR) preferably is calculated by using two antennas. One antenna is placed near the login button and the other near the repair point. Since, e.g., the antennas aren't placed exactly at these points, the amount of extra belt between these points, or offset distance, needs to be known. If work is performed behind the take-up, this distance is calculated by the equation Y+X if the login button is closer to the work area than the top antenna and Y−X if the top antenna is closer to the work area than the login button. X is the distance from the login push button to the top antenna and Y is the distance from the work area to the bottom antenna. Both antenna must be placed on the same side of the drive where work is to be performed. If work is performed on the drive side, the offset distance is the same value as if work was done behind the take-up, but opposite in sign (if the offset distance was positive it becomes negative and if it was negative it becomes positive). If the offset distance turns out to be a negative value, select the fifth digit from the right using the Digit Select button and press either the Digit Up or Digit Down buttons to toggle between a negative and a positive number.

The next setting which needs to be set up is the Unloaded Belt Drift. This can be found in a number of ways. One way involves shutting the belt down, and at the same time placing a footage counter onto the belt and reading the counter when the belt stops. This value is taken as the belt drift. Another way this value can be obtained is by pressing the button next to the Unloaded Belt Drift display the moment power is cut to the conveyor and reading the value shown in the Feet from Zero display after the belt stops. The BPU must be in Setup Mode for this operation to work.

The final setting which should be set is the Take-Up Length. The take-up length is the amount of useable belt in the take-up and should be loaded with the amount of useable belt currently in the take-up. Note: Take-Up Length cannot be tracked if work is being done on the drive side.

Now, after all the settings have been entered, hold the Setup Mode button for about 3 seconds until the Unloaded Belt Drift, Roller Circumference, and Offset Distance displays go blank. This returns the BPU to normal operating mode.

Further explanations of FIGS. 14 and 16-30 are as follows:

FIGS. 14, 14A, 14B

Today, a belt inspector can spend a considerable amount of time finding bad places in a conveyor belt. A belt maintenance crew must spend about the same amount of time trying to find the same places and spend more time trying to position these places for repair and hope these are the same places that the inspector found.

Using the Belt Positioning Unit eliminates the need for the belt maintenance crew to relocate these places making belt maintenance much more efficient.

Features and Benefits

Figure 14:
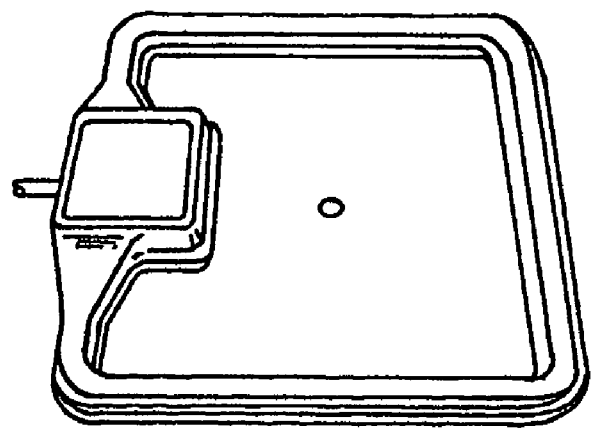

FIG. 14—Antenna and Tag (Center of Antenna): The tag is vulcanized into the belt while the antenna is mounted stationary. The tag with the antenna establishes a zero set point in the belt.

Figure 14A:
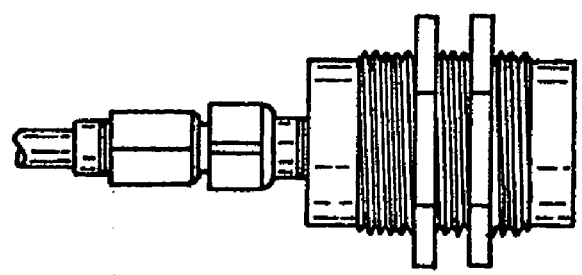

FIG. 14A—Inductive Pickup: The inductive pickup drives the feet from zero counter which gives belt length from the zero set point.

Figure 14B:
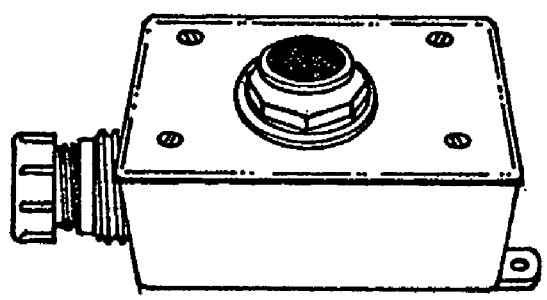

FIG. 14B—Log-In Push Button: The log-in push button is used to log-in positions that need to be inspected and/or repaired.

FIGS. 16, 16A

Figure 16:
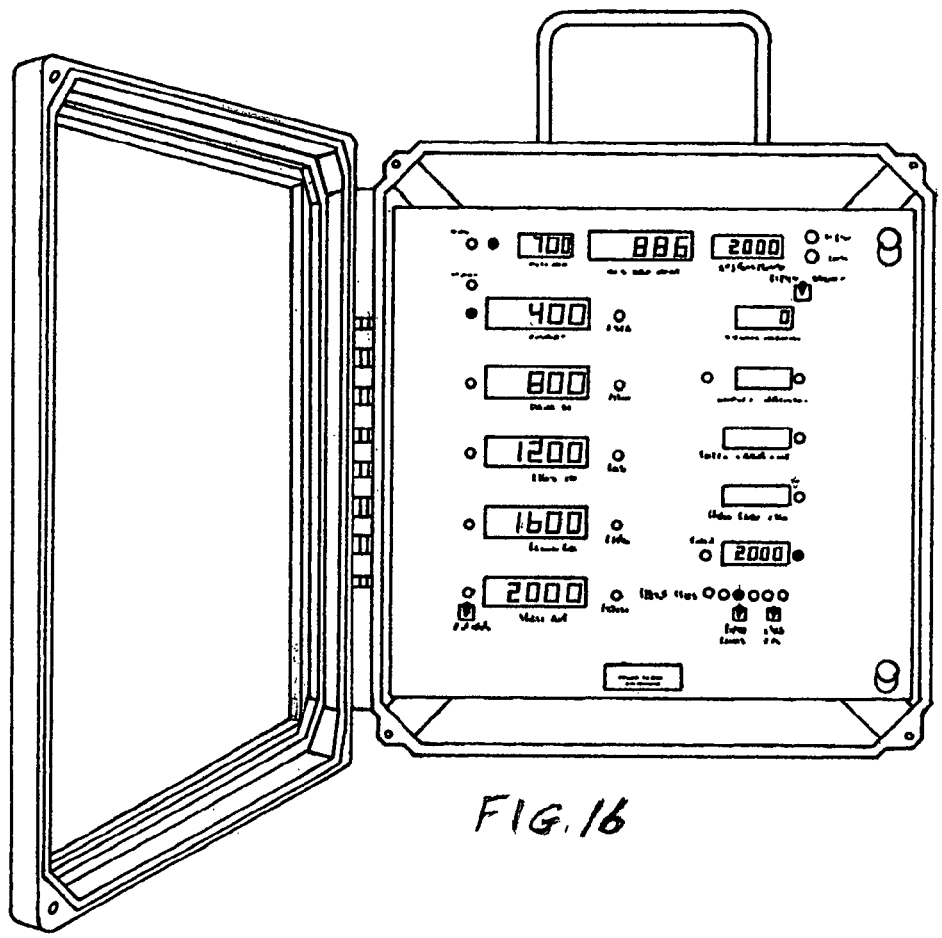
Figure 16:
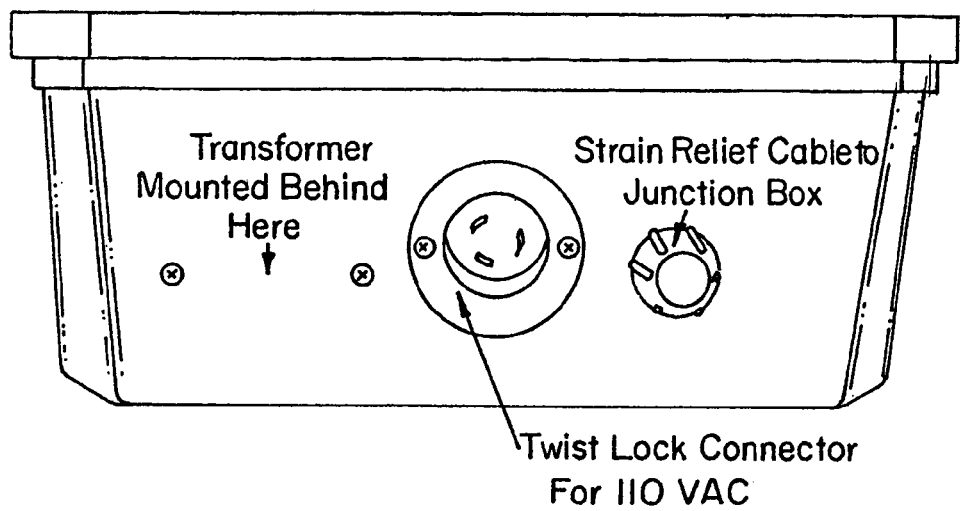

The Main Enclosure of the Belt Positioning Unit of FIG. 16 consists of the display panel and microcontroller housed in 13.86"×15.49"×6.34" NEMA4X fiberglass enclosure with a clear polycarbonate window. FIG. 16A shows a view of the bottom of the main enclosure. Power is 110 VAC and is supplied to the box by a 10 feet long, 14 gauge, 3 conductor SO cord and connected to the enclosure through a twist plug connector. It is the responsibility of the mines to supply 110 VAC with ground fault interruption at the main enclosure.

FIG. 17

Figure 17:
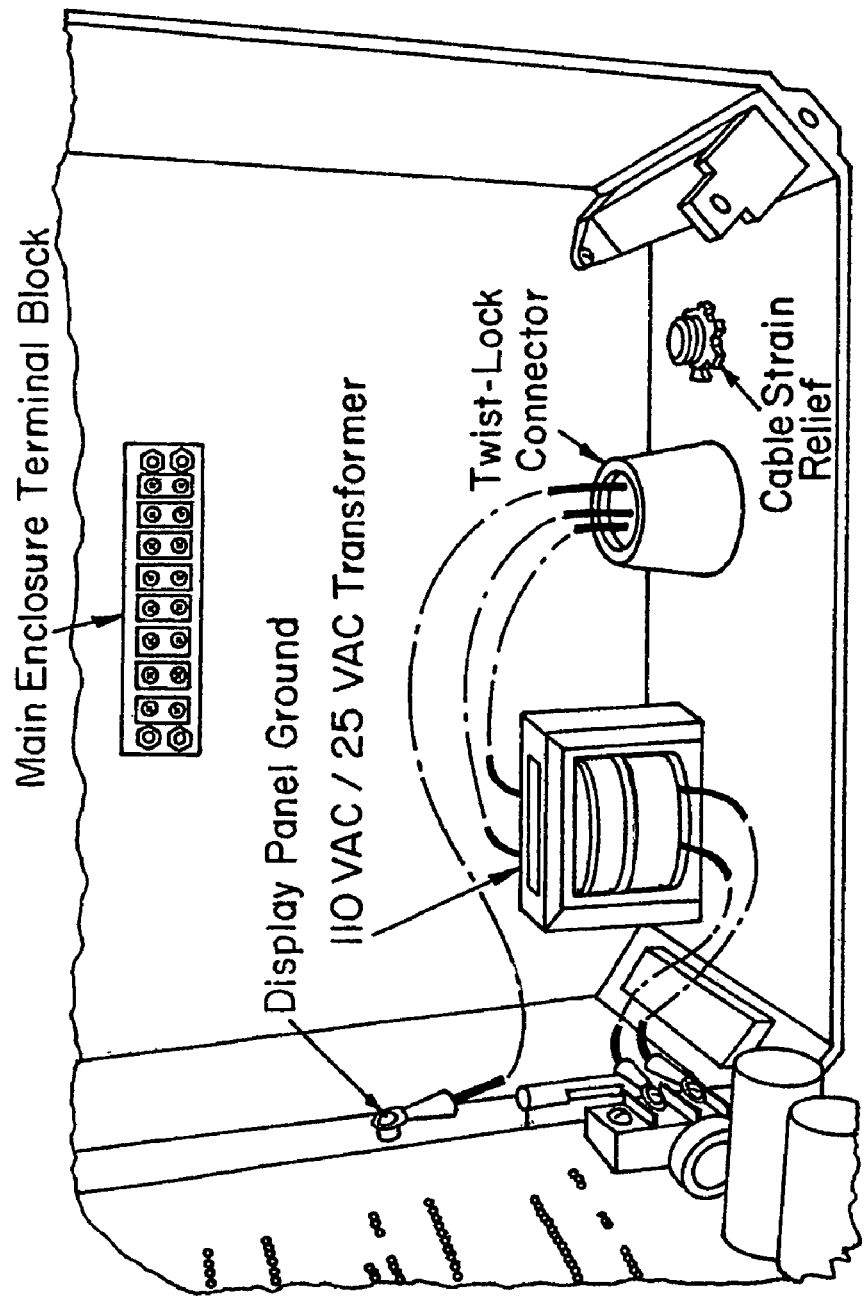

The inside of the main enclosure is shown in FIG. 17. Inside the enclosure, the power is then connected from the twist plug connector to a 75 VA, 110 VAC/25 VAC transformer, and the secondary of the transformer is then connected to a terminal block located on the display panel board. Regulators on the board convert this voltage to 5 VDC and 15 VDC. The 5 VDC is used to drive the display panel board and the 15 VDC is sent on the cable connected to the junction box to drive the sensors. The ground wire connected to the twist lock connector should be connected to the display panel. A shielded, twelve conductor, 24 gauge, twisted pair cable is connected to the main enclosure terminal block, run through the cable strain relief, and connected to the terminal block located inside the junction box. The terminal block connections mounted on the back wall of the enclosure are marked as follows:

Main Enclosure Terminal Block Wiring (Left to Right)

| Terminal | Wire Color(s) | Signal |
|---|---|---|
| Terminal 1 | Red/Blue, Brown/White, Green/White | +15V |
| Terminal 2 | Blue/Red, White/Brown, White/Green Shield | GND |
| Terminal 3 | Orange/White | Inductive Pickup |
| Terminal 4 | Blue/White | Log-In Button |
| Terminal 5 | Gray/White | RS-485-B+ |
| Terminal 6 | White/Gray | RS-485 A− |
| Terminal 7 | Not Used | N/A |
| Terminal 8 | Not Used | N/A |

The White/Orange and White/Blue wires should be left unconnected.

Figure 18:
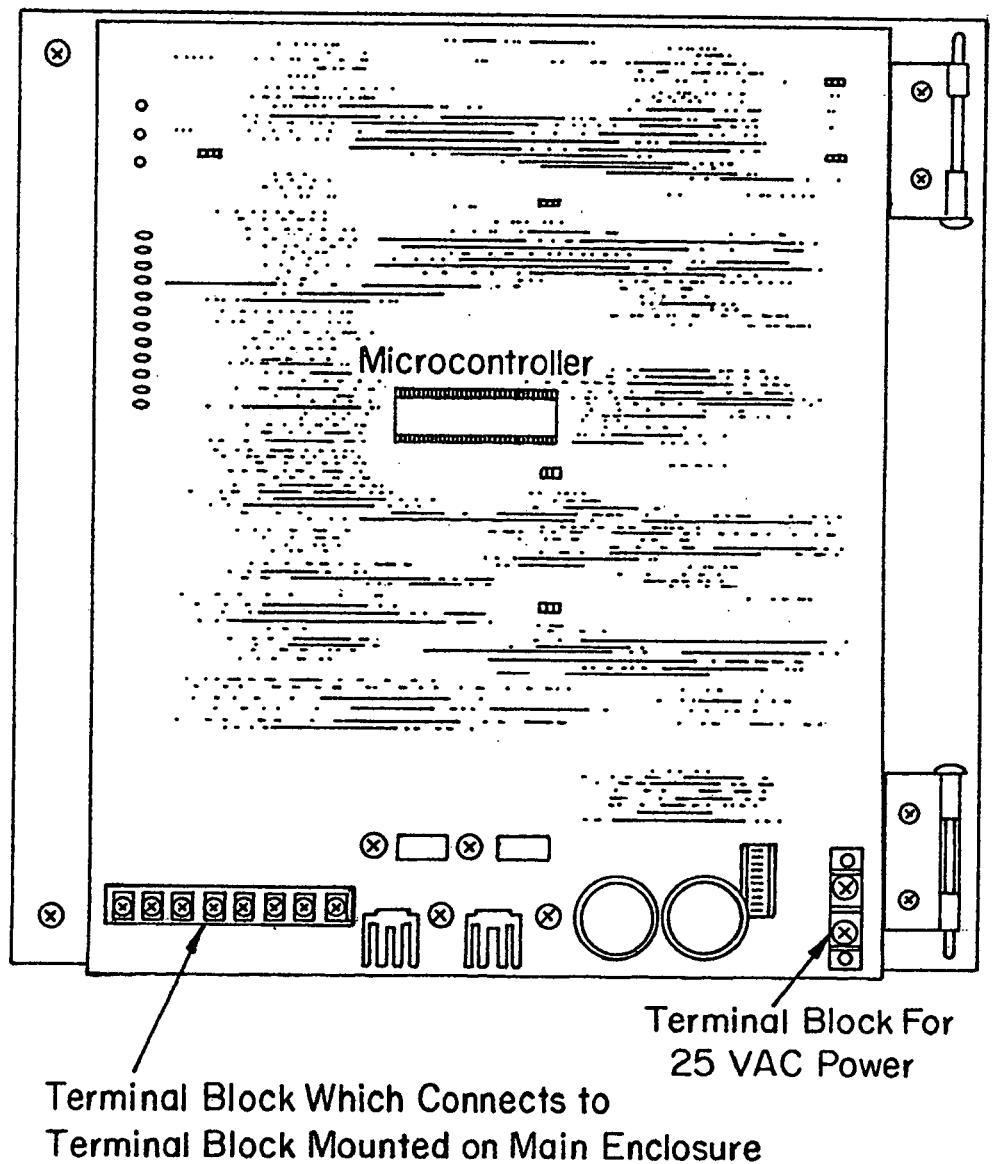

FIG. 18—Display Panel

The display panel is mounted behind a grounded 12.56"×12.38"×0.08" aluminum swing panel.

The signal names on the eight terminal block on the back of the display panel are marked as follows (from right to left):

Terminal 1: +15V

Terminal 2: GND

Terminal 3: Inductive Pickup

Terminal 4: Log-In Button

Terminal 5: B+

Terminal 6: A−

Terminal 7: OUT1

Terminal 8: IN1

A shielded, twelve conductor, 24 gauge, twisted pair cable is used to connect the main enclosure terminal block to the terminal block located on the display panel board. The terminal block on the display panel should be connected to the terminal with the matching signal name on the back wall of the enclosure for each signal.

Figure 19:
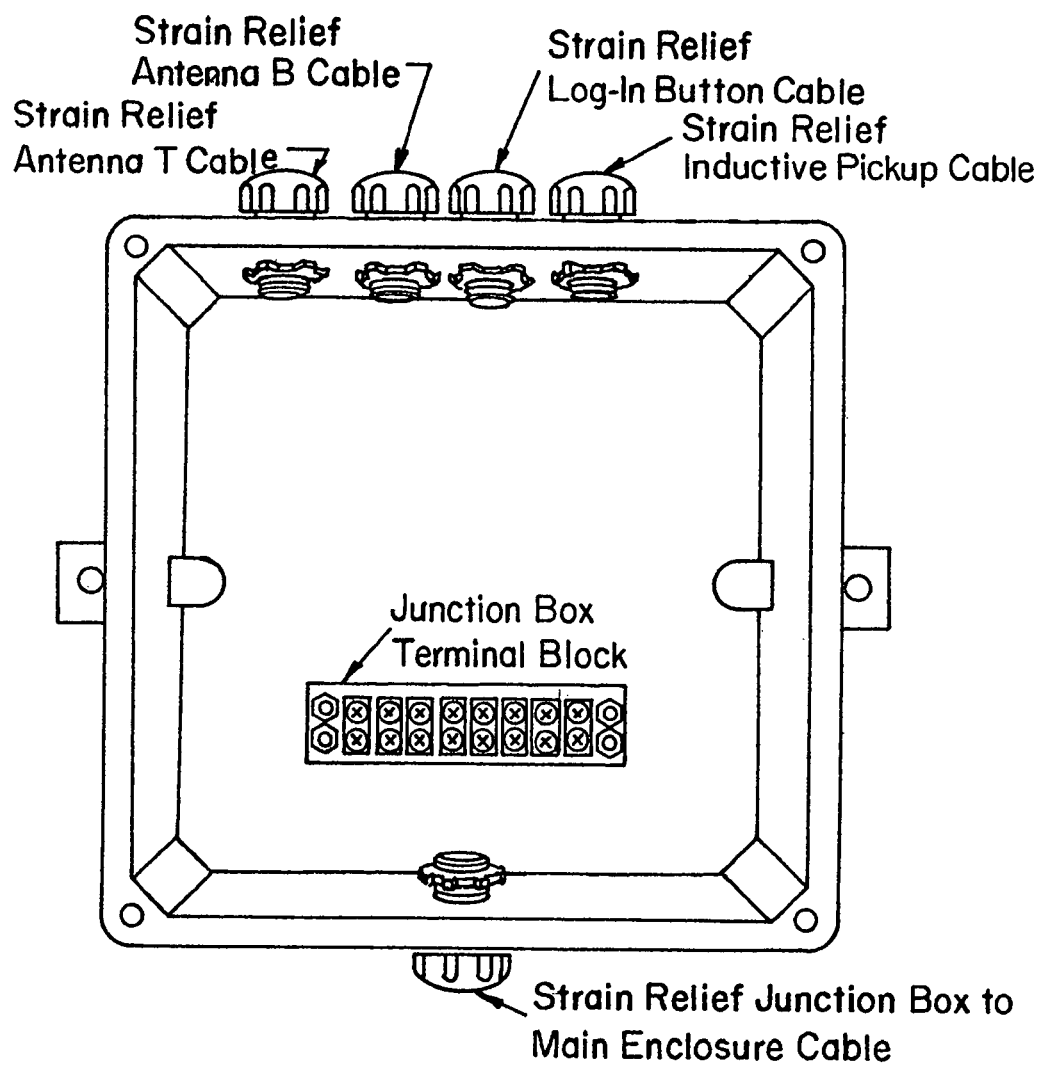

FIG. 19 Junction Box

The Junction Box of the Belt Positioning Unit consists of the two antenna readers and a terminal block housed in a NEMA4X, 8"×8"×4" fiberglass enclosure with a screw cover. There are five cable strain relief connectors for the cables from the Main Enclosure, Log-In Push Button, Inductive Pickup, Antenna T, and Antenna B. A view of the inside of the junction box is shown in FIG. 19.

The junction box should be mounted no more than 300 feet from the main enclosure due to excessive voltage drop across the line. The terminal block connections mounted on the back of the enclosure are as follows:

Junction Box Terminal Block Wiring (Left to Right)

| Terminal | Wire Color(s) | Signal |
|---|---|---|
| Terminal 1 | Red/Blue, Brown/White, Green/White | +15 V |
| Terminal 2 | Blue/Red, White/Brown, White/Green Shield | GND |
| Terminal 3 | Orange/White | Inductive Pickup |
| Terminal 4 | Blue/White | Log-In Button |
| Terminal 5 | Gray/White | RS-485-B+ |
| Terminal 6 | White/Gray | RS-485 A− |
| Terminal 7 | Not Used | N/A |
| Terminal 8 | Not Used | N/A |

Figure 20:
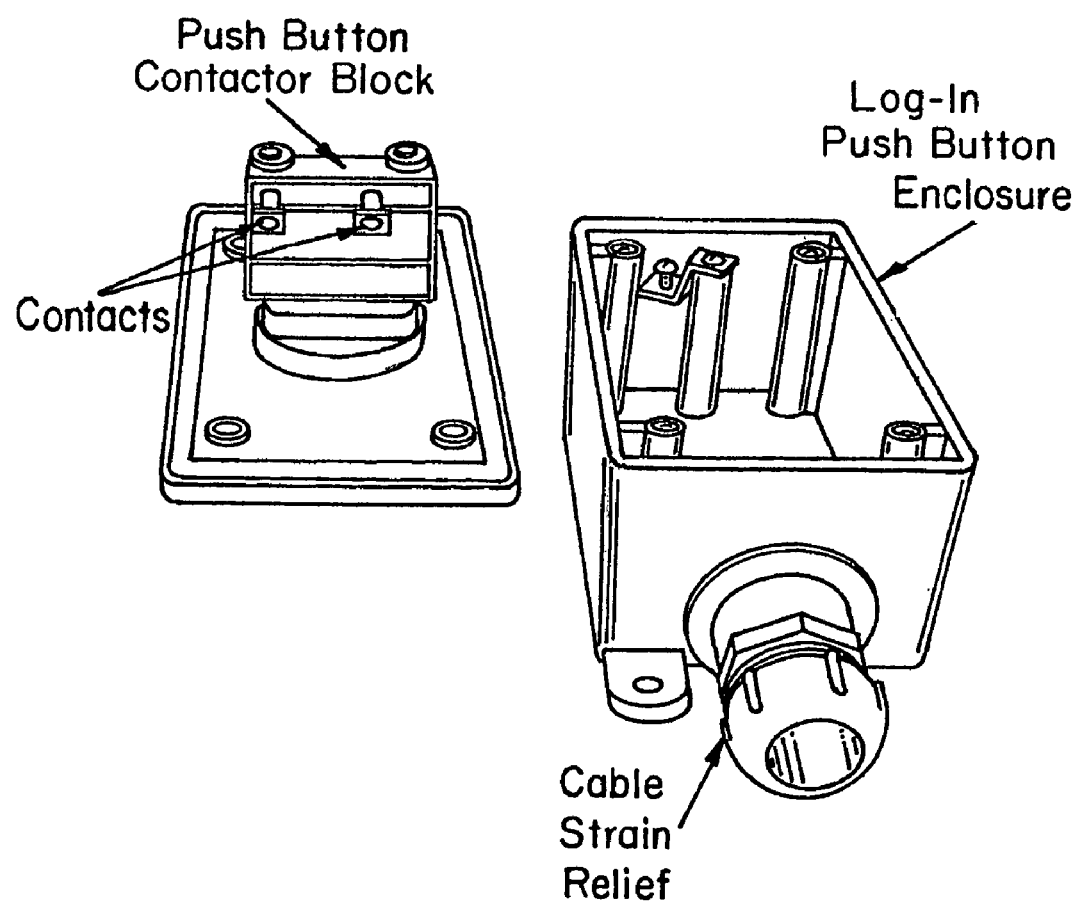

FIG. 20—Login Push Button

The Login Push Button should be mounted where the belt inspector normally inspects the conveyor belt. The push button contact block is mounted in a 2¾"×4½"×2" NEMA4X fiberglass enclosure with a screw cover. A cable strain relief connector is provided for the shielded, four conductor, 24 gauge, twisted pair cable. The maximum current draw of the login push button is 10 mA. The Blue/White and White/Blue wires of one end of the cable are connected to the contact block on the log-in button while the Orange/White, White/Orange, and Shield wires are left unconnected. The cable is then run through the strain relief of the log-in button enclosure to a strain relief on the junction box and the Blue/White, White/Blue, and Shield wires should be connected to Terminals 1, 4 and 2 respectively (+15V, Log-In Button, and GND signals). The Orange/White and White/Orange wires are not connected.

FIG. 21—Inductive Pickup

The Inductive Pickup is mounted on the frame of a top roller which turns even when the conveyor belt is unloaded. The pickup is housed inside a nickel-plated brass housing with a diameter of approximately 1.10" and length of about 1.18" rated at 10-40 VDC input voltage with a maximum current draw of 200 mA. The actual voltage connected to the pickup is +15 VDC. A 3 wire, 2 meter cable comes attached to the inductive pickup. This cable should be spliced to the shielded, four conductor, 24 gauge, twisted pair cable running to the junction box as follows:

| Wire on Inductive Pickup Cable | Cable From Junction Box | Signal |
|---|---|---|
| Brown | Blue/White | +15V |
| Black | Orange/White | Inductive Pickup |
| Blue | White/Blue | GND |

The White/Orange wire and the shield wire are left unconnected.

The cable is then run through the strain relief of the junction box and connected to the terminal block inside the junction box as follows:

| Wire on Four Conductor Twisted Pair Inductive Pickup Cable | Terminal |
|---|---|
| White/Blue, Shield | Terminal 2 |
| Orange/White | Terminal 3 |
| Blue/White | Terminal 1 |
| White/Orange | Unconnected |

FIGS. 22, 22A

Figure 22:
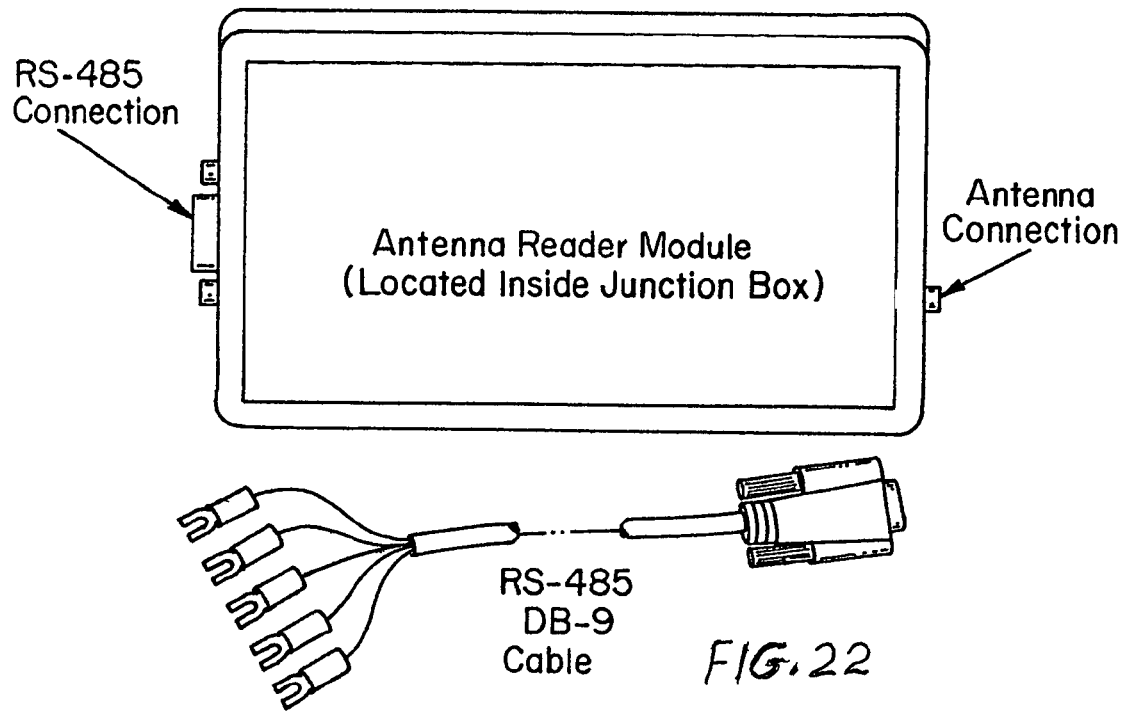
Figure 22:
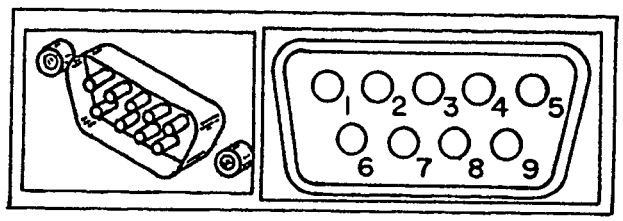

Shown in FIG. 22, there are two antenna readers mounted in the junction box. One reader is connected to Antenna T (top antenna) and another is connected to Antenna B (bottom antenna). Views of an antenna reader and associated RS-485 cable are shown in the figures below. Each reader is rated at 12 VDC and draws a maximum of 8 VA with a transmitting power of 1 W at a frequency of 13.56 MHz to the antennas.

The RS-485 cable is connected to the terminal block inside the junction box as shown in FIG. 22A.

| Wire on RS-485 Cable | Terminal | Signal |
| --- | --- | --- |
| Red | Terminal 1 | +15V |
| Yellow | Terminal 2 | GND |
| Orange | Terminal 5 | RS-485 B+ |
| Brown | Terminal 6 | RS-485 A− |
| Black | N/A | Unused |
| Wire on DB9 Cable | Pin Number | Signal |
| Red | Pin 9 | +15V |
| Yellow | Pin 5 | GND |
| Orange | Pin 3 | RS-485 B+ |
| Brown | Pin 2 | RS-485 A− |

FIG. 23—Antennas

Figure 23:
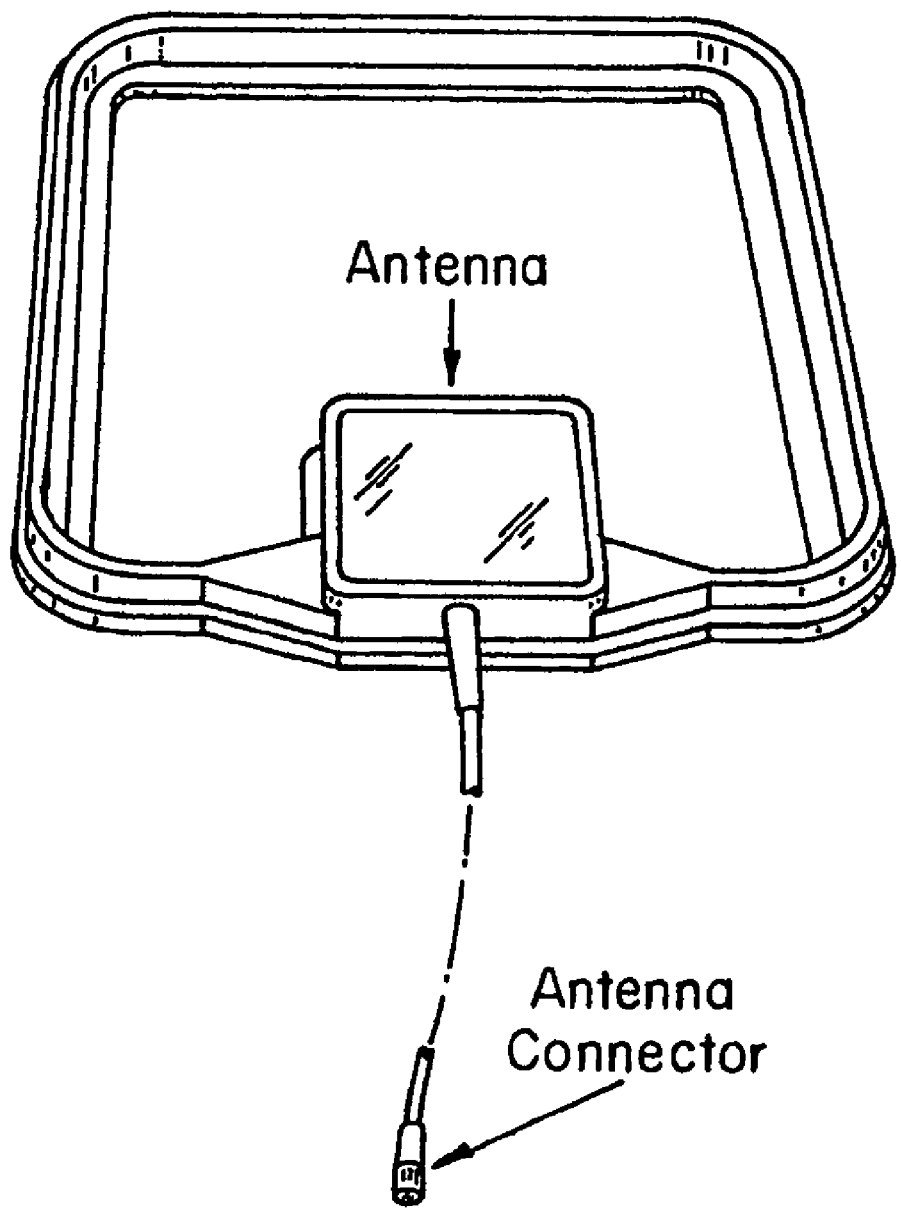

There are two antennas as shown in FIG. 23 in the Belt Positioning Unit System (Antenna T and Antenna B). Each antenna comes with approximately 10 feet of RG-58 cable with an SMA connector at the end. The housing has dimensions of 322×337×38 mm. The mounting of the two antennas is demonstrated in the following sections. After mounting the antennas, the cable of each antenna should be run into the junction box through the strain reliefs and connected to the reader corresponding to that antenna.

FIG. 24—Antenna T

Figure 24:
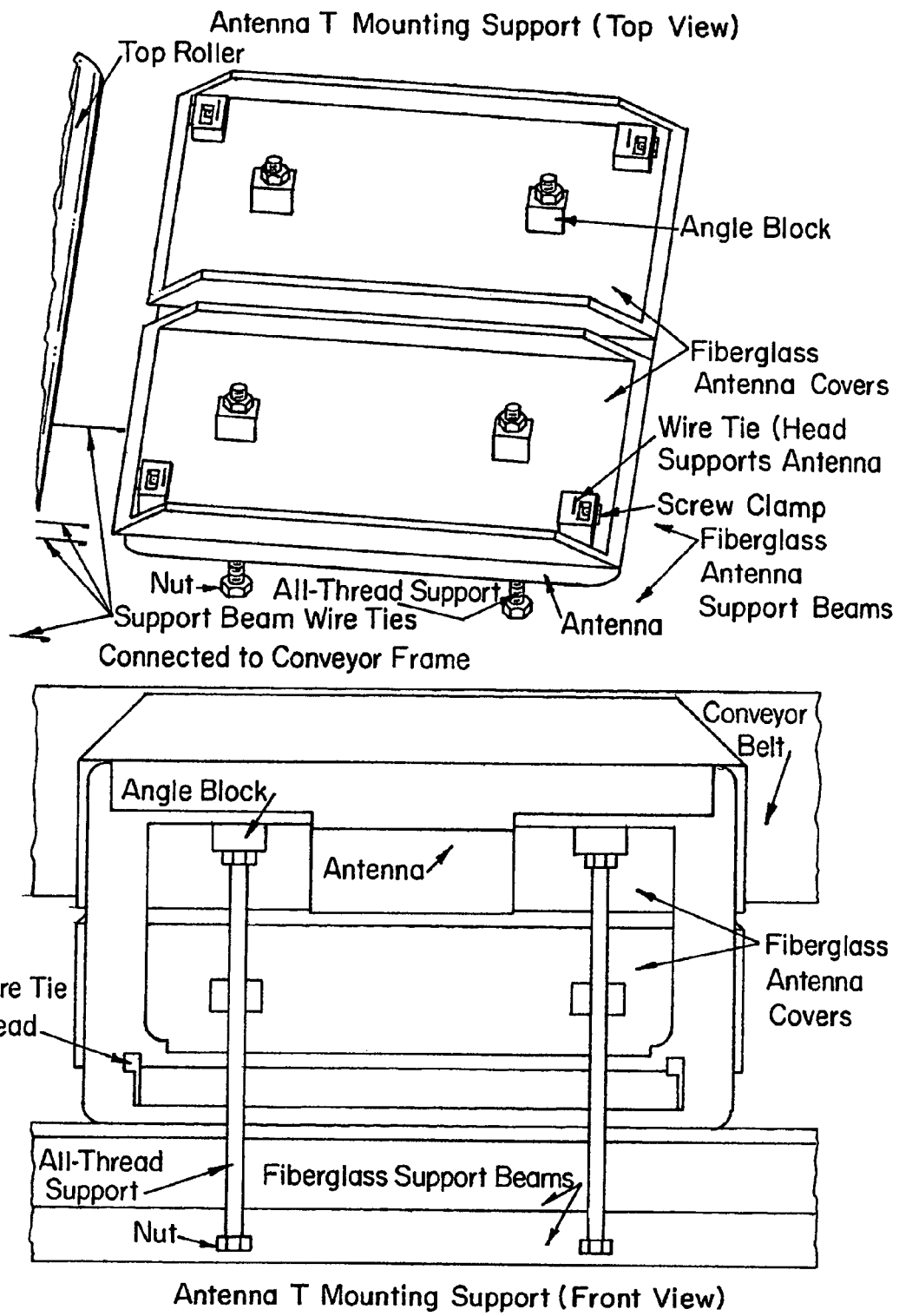
Figure 27:
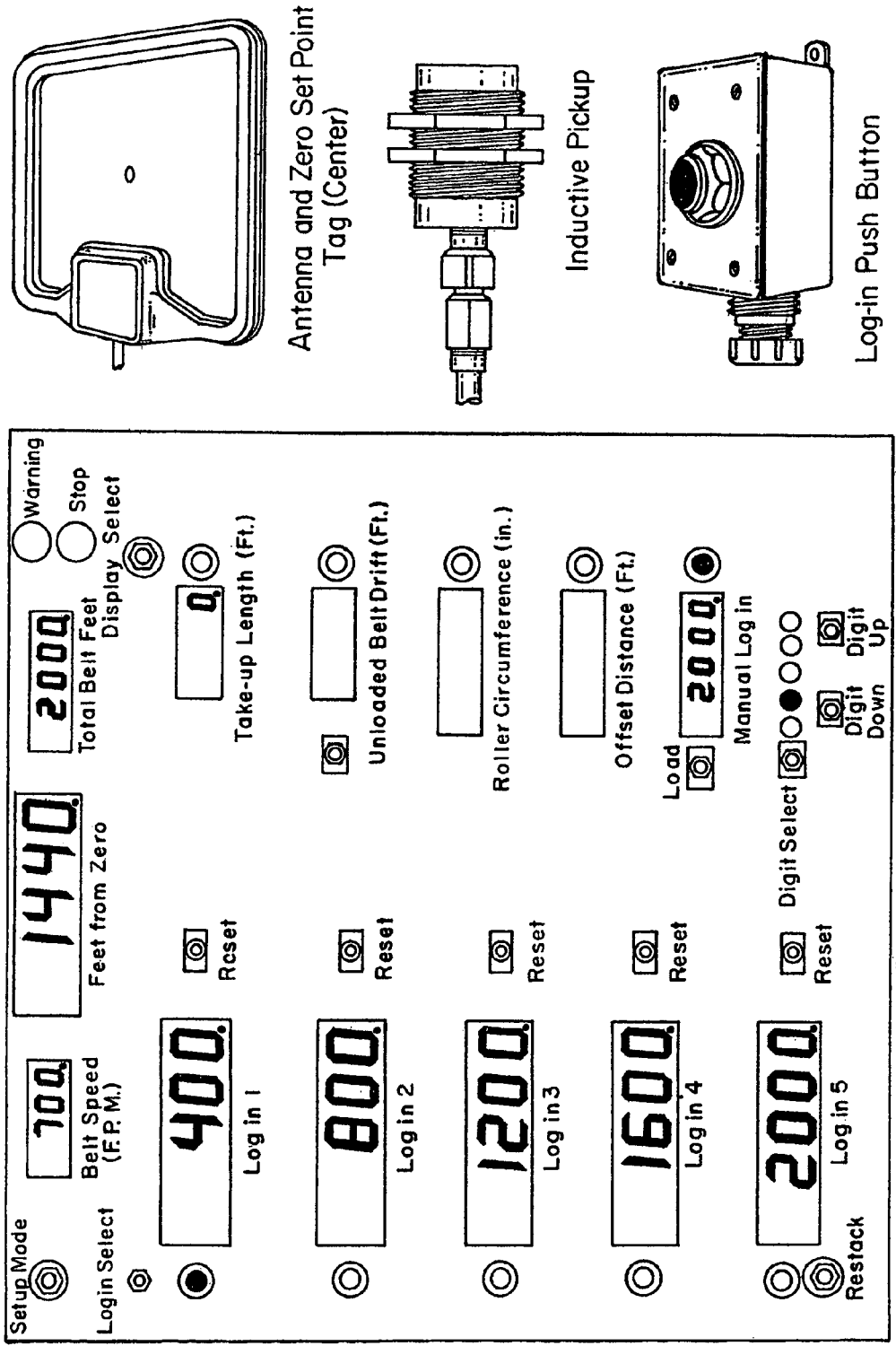
Figure 30:
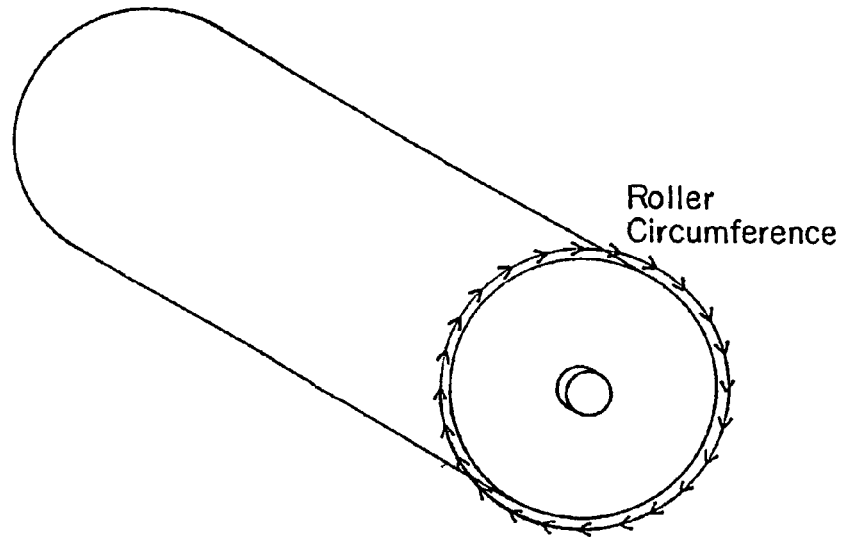

Antenna T is mounted below the top of the conveyor belt as shown in FIG. 24.

FIG. 25—Antenna B

Antenna B is mounted below the top of the conveyor belt as shown in FIG. 25.

FIG. 26—Installation Equipment

The belt cookers are used to vulcanize the RFID (Radio Frequency Identification) tags into the conveyor belt. FIG. 25 shows a belt cooker with the top cover removed. The belt cookers operate at a voltage of 110 VAC and draw 400 W of power. The 6 5/16"×10"×3/4" aluminum housing is grounded using the ground wire on the power cable. The power cable is a 14 gauge, 3 conductor cable with a strain relief on the housing and a 3 prong power plug at the end.

The router, digital thermometer, and glue and gum used in the installation are also shown. The thermometer is CE, CSA, and TUV approved, and the router is UL approved.

FIG. 27

After years of development, Rock and Coal Equipment is pleased to introduce the Belt Positioning Unit for belt conveyor systems. The major components of the Belt Positioning Unit are as follows:

1. Antenna and Tag (Center of Antenna): The tag is vulcanized into the belt while the antenna is mounted stationary. The tag with the antenna establishes a zero set point in the belt.
2. Inductive Pickup: Drives counter which gives belt length from the zero set point.
3. Log-in Push Button: Used to log in footage at places that need attention. Up to five such places can be logged in.

FIG. 28—Offset Distance Scenarios 1 and 2

Work Performed Behind Take-up

Let's say the distance between the Work Area and the Bottom Antenna is measured to be 50 feet and that the distance between the Login Button and the Top Antenna is measured to be 20 feet. So Y=50 feet and X=20 feet.

1: Login Button Closer to Work Area than Top Antenna

For Scenario 1 the Offset Distance is Y+X or 50 feet+20 feet=70 feet since the Login Button is closer to the Work Area than the Top Antenna.

2: Top Antenna Closer to Work Area than Login Button

For Scenario 2 the Offset Distance is Y−X or 50 feet−20 feet=30 feet since the Top Antenna is closer to the Work Area than the Login Button.

FIG. 29—Work Performed In Front Of Drive—Scenarios 3 and 4

3: Login Button Closer to Work Area than Top Antenna

For Scenario 3 the Offset Distance is −(Y+X) or −(50 feet+20 feet)=−70 feet since the Login Button is closer to the Work Area than the Top Antenna.

4: Top Antenna Closer to Work Area than Login Button

For Scenario 4 the Offset Distance is −(Y−X) or −(50 feet−20 feet)=−30 feet since the Top Antenna is closer to the Work Area than the Login Button.

This invention has been described in detail with particular reference to preferred embodiments thereof, but it will be understood that variations and modifications will be effected within the spirit and scope of the invention.

I claim:

1. The method for facilitating the maintenance of a conveyor structure having a long and heavy duty continuous conveyor belt mounted on belt supporting rollers which are mounted on a base, a conveyor drive roller on said base for engaging and cycling said belt, electric drive motor structure for rotating said drive roller, and a belt take-up section positioned intermediate opposite ends of said conveyor structure for supporting a portion of said belt, said method comprising the steps of establishing one or more stationary zero set (counter reset) points on said structure, providing one or more cycle points on said belt, each said cycle point marking a terminus of a designated travel footage of said belt, providing a belt travel footage counter on said conveyor structure for measuring the footage traveled by any of said cycle points on said belt beyond one or more designated zero set points, providing one or more target (work) stations along and in proximity to said belt, providing a belt travel footage reset for resetting said counter to a desired starting belt travel footage reading when a designated cycle point arrives at a designated zero set point, spotting one or more event sites on said belt, a computer for receiving and processing data signals that an event site has been spotted, and providing said computer with belt take-up run footage and belt drift footage data sufficient to determine a power shut off point for said motor whereby a said event site will drift with marked accuracy to a designated target station.

2. The method of claim 1 wherein each said cycle point on said belt comprises a radio frequency identification (RFID) tag, and wherein each said zero set point comprises an RF antenna mounted on stationary portions of said conveyor structure, whereby at each conjunction of a designated cycle point and a designated zero set point said RF antenna and said reset will reset the counter to a prescribed reading.

3. The method of claim 1 wherein said belt take-up run footage is measured by an RFID tag affixed to said belt, and a pair of RF antenna, one each of said antenna being affixed to a stationary portion of said conveyor structure spaced beyond opposite ends of said take-up section, whereby when said RFID tag passes by and signals in turn both antenna of said pair, the actual belt footage (BTR) which travels between said antenna and thru said take-up section is automatically entered into said computer.

4. The method for facilitating the maintenance of a conveyor structure having a long and heavy duty conveyor belt mounted on rollers which are mounted on a base, a drive roller engaging said belt, an electric drive motor for rotating said drive roller, and a belt take-up section intermediate opposite ends of said conveyor structure, said method comprising the steps of establishing a stationary zero set (counter reset) point on said structure, providing a cycle point on said belt, said cycle point marking a terminus of one lap of said belt, providing counter on said conveyor structure for measuring the footage traveled by said cycle point on said belt beyond said zero set point, providing one or more target (work) stations along and in proximity to said belt, providing a reset for resetting said counter to zero footage reading when said cycle point arrives at said zero set point, spotting one or more event sites on said belt, transmitting a signal to a computer that said one or more event sites have been spotted, said computer being provided with belt take-up run footage and belt drift footage data sufficient to determine a power shut off point for said motor whereby a selected one of said event sites will drift with marked accuracy to a designated target station.

5. The method of claim 1 wherein said cycle point on said belt comprises a radio frequency identification (RFID) tag, and wherein said zero set point comprises an RF antenna mounted on a stationary portion of said conveyor structure, whereby at the conjunction of said cycle point and said zero set point, said RF antenna and said counter will reset the counter to zero.

6. The method of claim 1 wherein said belt take-up run footage is measured by an RFID tag affixed to said belt, and a pair of RF antenna, one each of said antenna being affixed to a stationary portion of said conveyor structure spaced beyond opposite ends of said take-up section, whereby when said RFID tag passes by and signals in turn both antenna of said pair, the actual belt footage (BTR) which travels between said antenna and thru said take-up section is automatically entered into said computer.

7. A conveyor system particularly useful for heavy load haulage over long distances and comprising a continuous conveyor belt constructed of belt sections connected by multiple splices of mechanical, vulcanized or adhesive construction or the like, said belt being mounted on rollers supported on a conveyor frame, a drive roller means engaging said belt, an electric motor for driving said drive roller and said belt, a discharge roller supporting said belt at one end thereof and a tail roller supporting said belt at the other end thereof, a belt take-up section supporting portions of said belt at a position intermediate said belt ends, said take-up section having a belt entry end and a belt exit end, an RF antenna mounted on said conveyor frame at positions exterior of said take-up section and spaced from said entry end and exit end thereof, an RFID tag affixed to said belt, a belt footage counter for obtaining a running count of belt footage passing by one or more designated positions on said frame, a target station work facility positioned stationarily at one or more designated locations alongside said conveyor, a reset for resetting said counter to a prescribed numeric value when said tag and said reset conjoin, a computer for receiving belt footage electronic signals from said counter and for receiving belt footage electronic signals from said RF antenna, whereby the (BTR) footage data can be used by the computer to determine a power shut off point for the drive motor.

8. The conveyor system of claim 7 wherein said counter is an inductive pick-up device.

9. The conveyor system of claim 7 wherein said computer is linked to a display screen which shows operating data including lighted numeric values for belt speed, belt feet beyond zero set point, operator entered event site data, take-up footage, unloaded belt drift, roller counter circumference, and offset footage.

10. The conveyor system of claim 9 wherein said computer and screen provide for multiple event site data log-ins wherein the order in which the event sites are to be brought to a repair station can be changed by an operator by his entering an altered order of event sites for repair into said computer.

* * * * *